(12) United States Patent
Mahoney et al.

(10) Patent No.: US 6,470,095 B2
(45) Date of Patent: *Oct. 22, 2002

(54) AUTOMATIC EXTRACTION OF TEXT REGIONS AND REGION BORDERS FOR AN ELECTRONIC WORK SURFACE

(75) Inventors: James V. Mahoney, Venice; Patrick Chiu, Menlo Park; Thomas P. Moran, Palo Alto; William J. van Melle, Los Altos, all of CA (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,896

(22) Filed: Oct. 13, 1998

(65) Prior Publication Data

US 2001/0043741 A1 Nov. 22, 2001

(51) Int. Cl.⁷ .................................................. G06K 9/48
(52) U.S. Cl. ...................................... 382/199; 382/194
(58) Field of Search ................................. 382/199, 200, 382/201, 202, 198, 203, 204, 266, 267, 269, 176, 180, 194, 256, 257, 258

(56) References Cited

U.S. PATENT DOCUMENTS

| | | | |
|---|---|---|---|
| 5,537,491 A | * 7/1996 | Mahoney et al. | ............ 382/218 |
| 5,583,949 A | * 12/1996 | Smith et al. | ................. 382/199 |
| 5,844,991 A | * 12/1998 | Hochberg et al. | ............ 382/218 |
| 5,889,886 A | 3/1999 | Mahoney | |
| 5,914,718 A | 6/1999 | Chiu | |
| 5,915,039 A | * 6/1999 | Lorie et al. | ................. 382/230 |
| 5,956,468 A | * 9/1999 | Ancin | ........................ 395/109 |
| 6,035,058 A | * 3/2000 | Savakis et al. | ............. 382/163 |

* cited by examiner

*Primary Examiner*—Andrew W. Johns
*Assistant Examiner*—Seyed Azarian
(74) *Attorney, Agent, or Firm*—Fliesler Dubb Meyer & Lovejoy LLP

(57) ABSTRACT

The spatial separations between clusters of objects on the electronic work surface are analyzed to automatically generate borders, which may be used in at least two manners. The borders may become explicit editable borders within an output image. Alternatively, the borders created may be implicit ephemeral borders. According to an aspect, a method uses the sufficient stability grouping technique to determine grouping of elements in the input image array into the text lines in the output text lines array. According to another aspect, a method uses the sufficient stability grouping technique to determine the amount of vertical expansion to apply to each text line so as to create text regions in the output array which correspond to the text lines in the input text lines array. According to yet another aspect, a method takes the text regions array as input and extracts enclosure borders from the text regions. The method according to this aspect applies distance thresholding and edge labeling based upon the contents of the text lines array. According to still another aspect, a method extracts structured borders from the text regions array. The method according to this aspect applies two-dimensional projection operations based upon the contents of the text lines array. According to yet still another aspect, a method extracts freeform linear borders from the text regions array. The freeform linear borders result from a Voronoi tesselation performed upon the contents of text regions array.

16 Claims, 23 Drawing Sheets

Figure 1a: Structured Borders Tessellating work surface

Tokyo
Shanghai
Singapore
Hong Kong

Honolulu
Sydney

Toronto
Vancouver

New York
Los Angeles
San Francisco

Buenos Aires
Brasilia

Moscow

London
Paris
Rome
Berlin

*FIG. 5*

Figure 1a: tructured borders tessellating work surface

Tokyo
Shanghai
Singapore
Hong Kong

Toronto
Vancouver

Moscow

London
Paris
Rome
Berlin

New York
Los Angeles
San Francisco

Honolulu
Sydney

Buenos Aires
Brasilia

*FIG. 21*

AUTOMATIC EXTRACTION OF TEXT REGIONS AND REGION BORDERS FOR AN ELECTRONIC WORK SURFACE

BACKGROUND OF THE INVENTION

1. Field of the Invention

The present invention pertains to the field of processing image data to generate useful groupings and partitioning within an image. Specifically, the present invention pertains to grouping images on an electronic work surface, generating regions according to the groupings, and dividing the electronic work using borders according to the regions.

2. Discussion of the Related Arts

Previous electronic work surface implementations include a pen-based system in which users can explicitly create borders one at a time on an electronic work surface. These borders include structured borders-straight line segments that tessellate the work surface into rectangular regions and freeform linear or enclosure borders which are freehand drawn straight lines and loop-shaped curves. The amount of a human user's time required to enter and edit such user-created borders is significant. Moreover, human error often brings the appropriateness of the user-created borders into question and requires his editing of the borders. As is apparent from the above discussion, it would be desirable to automatically generate the borders from an input array to save the user time and increase the precision with which the borders are generated.

SUMMARY OF THE INVENTION

Conventionally, users can explicitly create borders one at a time using a border creation gesture. The spatial separation between clusters of objects on the work surface often matches the user's perception of where to place the borders. The present invention presents image analysis methods for automatically generating structured, enclosure, and freeform borders that correspond closely to the borders that a human user would create based upon the same input image.

According to an aspect of the present invention, the spatial separations between clusters of objects on the electronic work surface are analyzed to automatically generate borders. The borders created according to the methods of the present invention are believed to resemble the borders that would be created by human users based upon their perception of the same input image.

The borders according to the present invention can be utilized in at least two manners. The borders may become explicit editable borders within an output image having the benefit that the automatic generation of the editable borders saves the user the time and effort of creating them himself. Alternatively, the borders created may be implicit ephemeral borders which free the user from having to delimit the structures unnecessarily and provide feedback during the course of a structured operation such as list operations. The image analysis methods according to the present invention comprises several aspects of transformations of image data.

According to an aspect of the present invention, a method defines regions that correspond roughly to lines of handwritten or typeset text on the electronic work surface. This method according to the present invention accepts an image array as input and produces a text lines array output. This method uses the sufficient stability grouping technique to determine grouping of elements in the input image array into the text lines in the output text lines array.

According to another aspect of the present invention, a method takes the text lines array as input and creates a text regions array. In this method, the text lines are expanded into regions corresponding roughly to the level of paragraphs. This method uses the sufficient stability grouping technique to determine the amount of vertical expansion to apply to each text line so as to create text regions in the output array which correspond to the text lines in the input text lines array.

According to yet another aspect of the present invention, a method takes the text regions array as input and extracts enclosure borders from the text regions. The method according to this aspect of the present invention applies distance thresholding and edge labeling based upon the contents of the text lines array.

According to still another aspect of the present invention, a method extracts structured borders from the text regions array. Structured borders are straight horizontal and vertical lines which divide the electronic work surface into rectangular spaces, in which each rectangular space in the structured borders array corresponds to a text region in the text regions array. The method according to this aspect of the present invention applies two-dimensional projection operations based upon the contents of the text lines array.

According to yet still another aspect of the present invention, a method extracts freeform linear borders from the text regions array. Freeform linear borders divide the electronic work surface into connected areas, in which each connected area in the freeform linear borders array corresponds to a text region in the text regions array. The freeform linear borders result from a Voronoi tesselation performed upon the contents of text regions array.

These and other aspects, features, and advantages of the present invention are fully described in the Detailed Description of the Invention and illustrated in the Figures.

BRIEF DESCRIPTION OF THE DRAWINGS

FIG. 5 is a visual representation of the text lines array generated by the method according to an aspect of the present invention illustrated in FIG. 4 from the input image array illustrated in FIG. 3.

FIG. 12 illustrates the method for extracting horizontal midlines. FIG. 13 illustrates the method for extracting vertical midlines. FIG. 14 illustrates the method for extracting structured borders from the horizontal and vertical midlines.

FIG. 21 is a visual representation of the structured borders array generated according to still another aspect of the present invention shown in FIGS. 10, 11, and 12 from the text regions array illustrated in FIG. 7.

The Figures are more fully explained in the following Detailed Description of the Invention.

DETAILED DESCRIPTION OF THE INVENTION

The methods according to the present invention provide functions for generating borders. A set of borders based on spatial separation of clusters of objects on the work surface is automatically generated. The methods can be invoked by the user to create explicit borders. The methods can also be used internally by the system to determine implicit borders for any operation for which the system needs to know the regions structure of the page. The function may be invoked either via a menu or by some special gesture command, and would apply to the current slide or page that is being displayed. The borders that are generated are the same kind of objects as the user created borders and may be edited by the user to achieve the desired border configuration.

Figure 3:
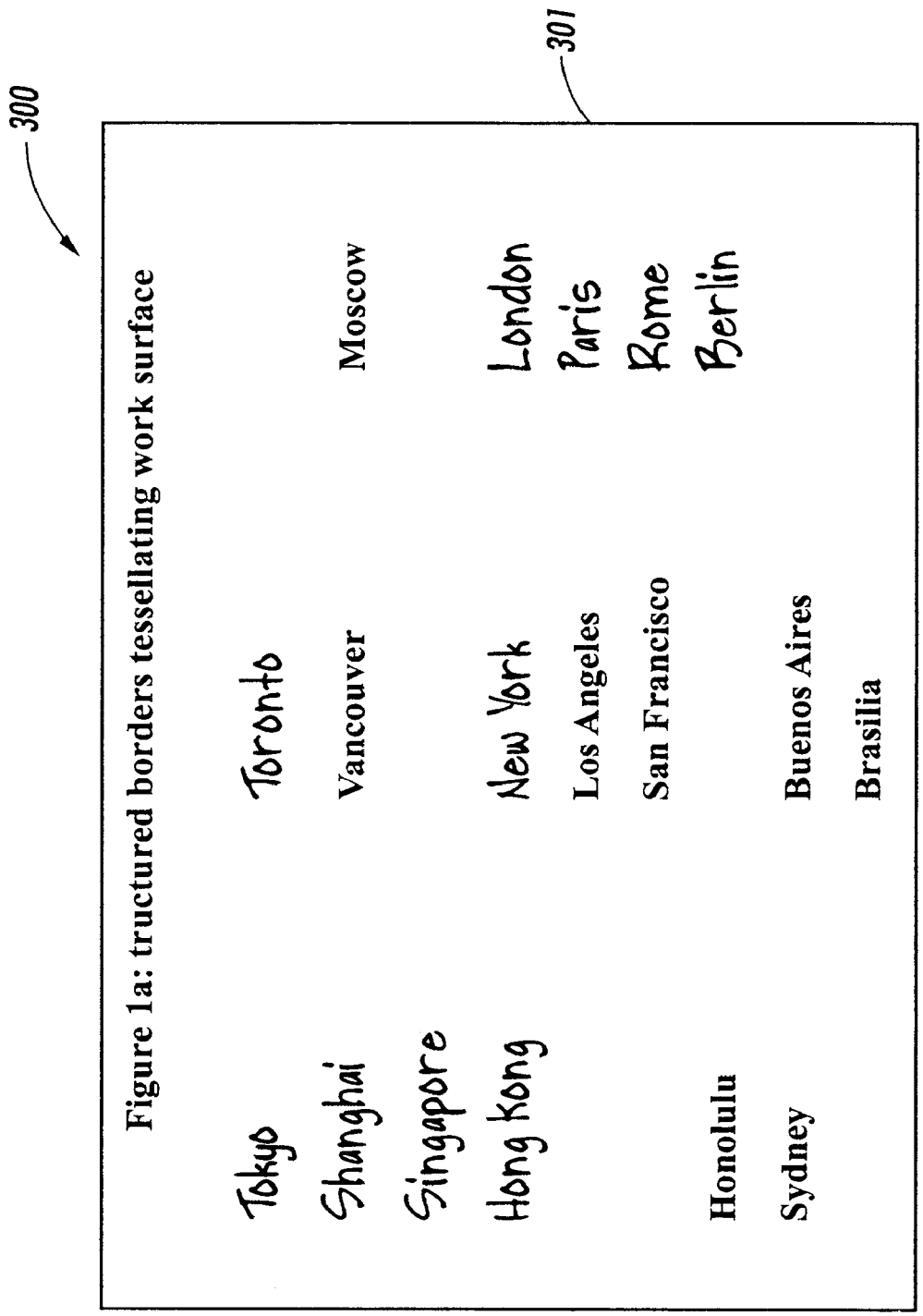
FIG. 3 is a visual representation of an input image array suitable for use by the method according to an aspect of the present invention for defining regions that correspond roughly to lines of handwritten or typeset text on an electronic work surface.

The methods according to the present invention are intended for use with an input image array having a set of character-level marks on the work surface such as illustrated in FIG. 3. It would be desirable to produce grouping and border information automatically on the electronic work surface to save the user time and to produce precise results. Two initial processes may therefore be needed to obtain this input image from the work surface.

Firstly, if the work surface includes non-textual marks such as diagrammatic markings that span perceptually distinct regions of text, then the non-textual marks must be detected and removed because the non-textual marks could cause these text regions to be grouped together by the methods according to the present invention. (This is the case, for example, when an arrow runs from one text region to another.) Often, such markings include distinguishing intrinsic properties such as size, line thickness, or color that make an a priori separation possible. For example, diagrammatic markings may be known to be quite large compared to text strokes.

When non-textual markings lack a distinguishing intrinsic property, for example, when the text strokes are cursive and therefore similar in size to the other markings, or when graphical markings consist of dashed lines, a complete a priori separation is more difficult. The user may use color, line thickness, or a distinct marking layer to detect the existence of non-textual marks.

Secondly, if the marks on the electronic work surface are represented in the form of strokes, then an initial process is required to render these marks into an image. Since the methods according to the present invention rely on inter-character spacings, the minimum resolution for this input image is one that preserves, for the most part, the separation of the strokes on the work surface. That is, the input image must have nearly the same topology as the work surface. Since the run time required to execute the methods according to the present invention increases as the square of the width of the input image array, smaller input image arrays are processed faster. This suggests that topology-preserving methods for rendering the work surface markings into a small array are worth considering. In the presently preferred embodiment of the present invention, the input image and the results are 736 by 512 pixels. The methods give similar results at half that resolution, but too much information is lost when the resolution is reduced beyond that by sampling.

Figure 1:
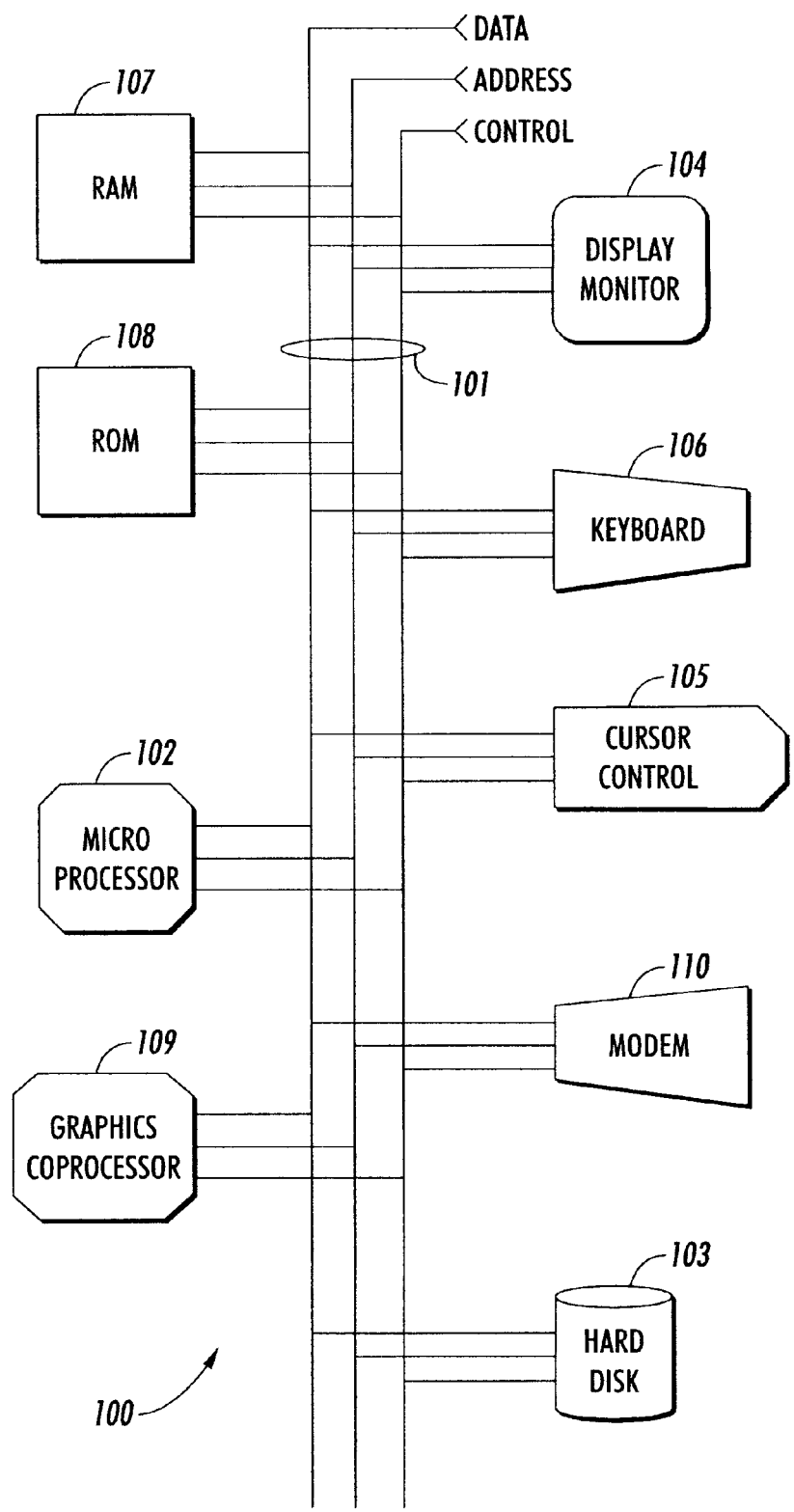
FIG. 1 illustrates a general purpose computer suitable for performing the methods of the present invention.

FIG. 1 illustrates a general purpose computer architecture 100 suitable for implementing the methods according to the present invention. The general purpose computer 100 includes at least a microprocessor 102, a display monitor 104, and a cursor control device 105. The cursor control device 105 can be implemented as a mouse, a joy stick, a series of buttons, or any other input device which allows a user to control position of a cursor or pointer on the display monitor 104. The general purpose computer may also include random access memory 107, external storage 103, ROM memory 108, a keyboard 106, a modem 110 and a graphics co-processor 109. All of the elements of the general purpose computer 100 may be tied together by a common bus 101 for transporting data between the various elements. The bus 101 typically includes data, address, and control signals. Although the general purpose computer 100 illustrated in FIG. 1 includes a single data bus 101 which ties together all of the elements of the general purpose computer 100, there is no requirement that there be a single communication bus 101 which connects the various elements of the general purpose computer 100. For example, the microprocessor 102, RAM 107, ROM 108, and graphics co-processor 109 might be tied together with a data bus while the hard disk 103, modem 110, keyboard 106, display monitor 104, and cursor control device 105 are connected together with a second data bus (not shown). In this case, the first data bus 101 and the second data bus (not shown) could be linked by a bidirectional bus interface (not shown). Alternatively, some of the elements, such as the microprocessor 102 and graphics co-processor 109 could be connected to both the first data bus 101 and the second data bus (not shown) and communication between the first and second data bus would occur through the microprocessor 102 and graphics co-processor 109. The methods of the present invention are thus executable on any general purpose computing architecture such as the 100 illustrated in FIG. 1, but there is clearly no limitation that this architecture is the only one which can execute the methods of the present invention.

Figure 2:
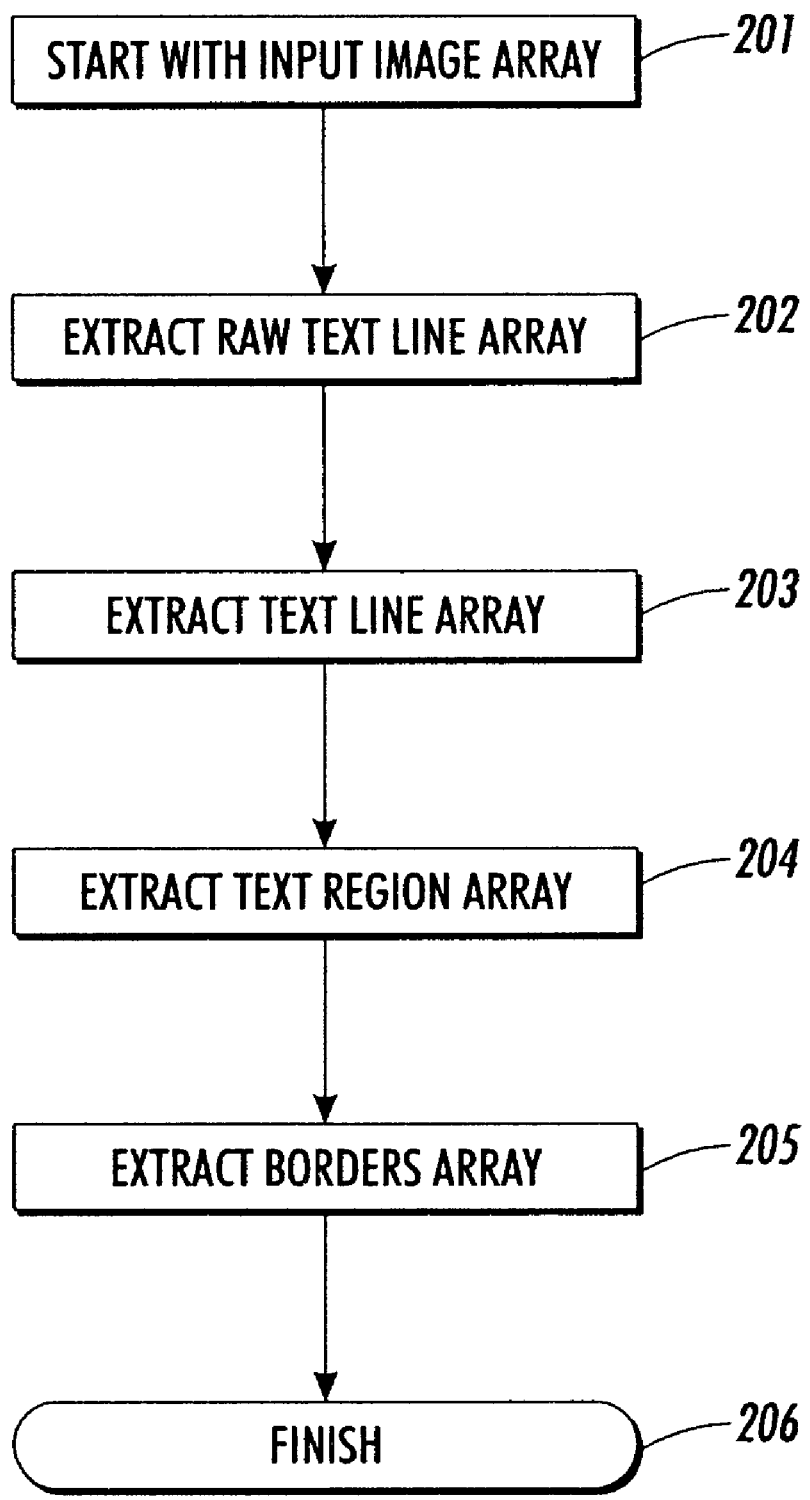
FIG. 2 illustrates the preferred implementation of methods according to the present invention in which the methods according to the various aspects of the present invention are applied sequentially.

FIG. 2 illustrates the preferred implementation of the present invention in which some of the methods of the various aspects of the present invention are executed sequentially. Starting with the input image array at step 201, the raw text lines array 202 is extracted at step 202. The text lines array is extracted from the raw text lines array at step 203. At step 204, the texts regions array is extracted from the text lines array. At step 205, a borders array which tesselates the work surface is extracted from the text regions array.

FIG. 3 is a visual representation of an image input array having an image border 301. The image input array shown in FIG. 3 is a two-dimensional Cartesian array of pixels, each of which assumes a state of either black and white pixels. A connected element consists of a series of adjacent black pixels.

The fundamental operation in extracting text lines is as follows: a white pixel in the input is set to black in the result if its horizontal distance value is less than the sufficient stability threshold computed from the horizontal distance values at vertical tessellation points. The black connected components of the result are termed raw text lines.

The horizontal distance at a white pixel is the distance to the nearest black pixel in the same image pixel row. A vertical tessellation point is a white pixel at which the distance to the nearest black pixel to the left in the same pixel row is equal to the right-adjacent white pixel's distance to its nearest black pixel to the right; or vice versa.

The sufficient stability threshold is defined in relation to the stability grouping approach disclosed in U.S. Pat. No. 5,537,491 entitled "Analyzing an Image or Other Data to Obtain a Stable Number of Groups" by Mahoney, et al., (hereinafter the '491 Patent) which is hereby incorporated herein by reference. Grouping, for this discussion, is the formation of equivalence classes of image elements by imposing a threshold on a distance relation defined either in the spatial dimensions or in a property dimension defined on those elements. Two elements are in the same class if the distance between them is less than the threshold; the equivalence classes are defined by transitive closure. The key issue is how to set the threshold so that the resulting groups are useful. Observe that the number of groups is a decreasing step function of the threshold. The method presented in '491 Patent employs a maximum stability criterion which chooses a value of the threshold in the widest constant interval of this step function; the algorithm in the '491 Patent extracted the smallest such value. The sufficient stability criterion, employed here, selects the smallest value of the threshold for which a given incremental change does not affect the number of groups. In the preferred embodiment, the allowed increment is one pixel, meaning that the threshold is chosen in the first interval of length greater than 1. This criterion is implemented by a simple, small change to the algorithm given in the '491 Patent, whose details are not discussed here. The smallest threshold for which the number of resulting groups equals the number of groups resulting from adding one to the threshold is the sufficient stability threshold.

Figure 4:
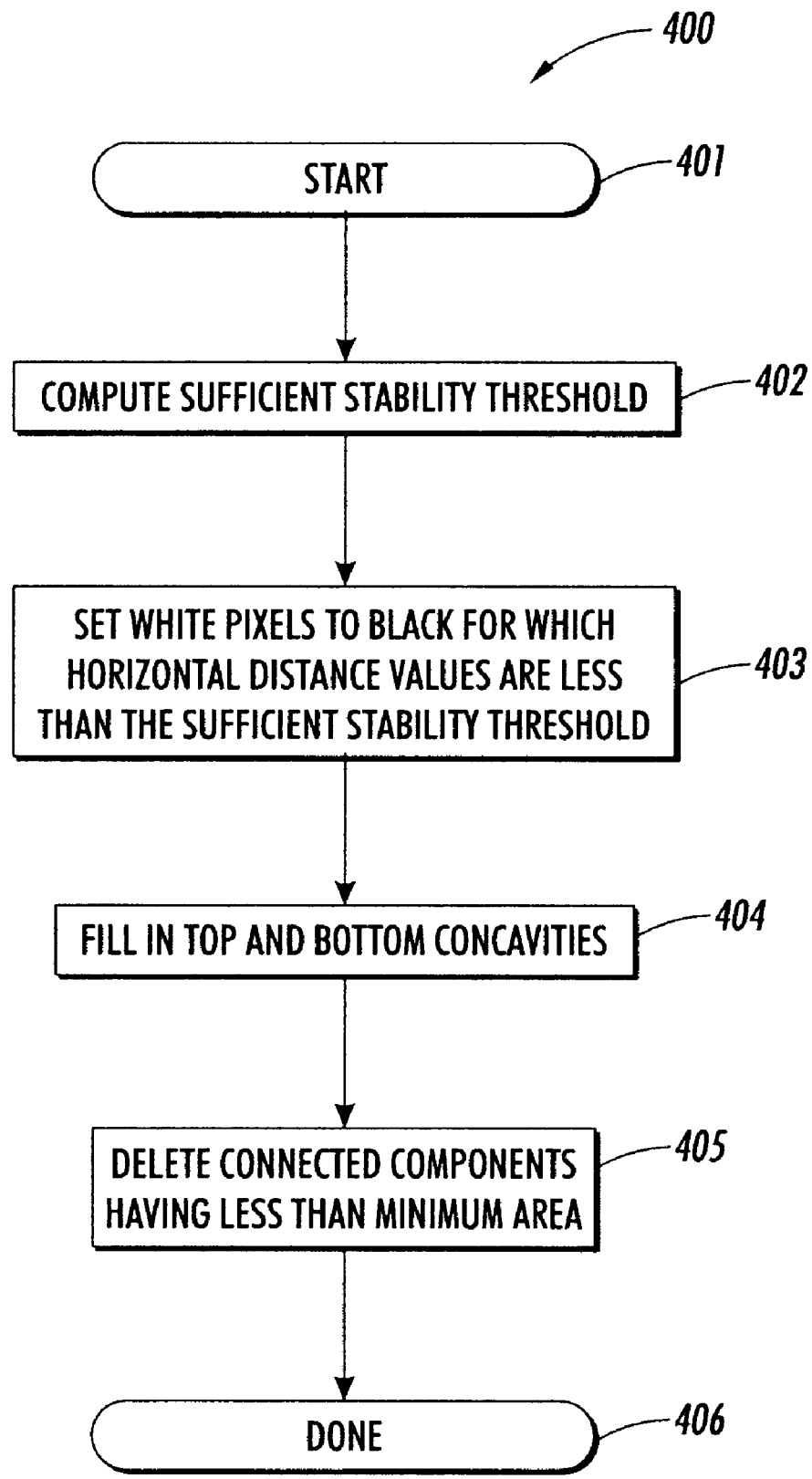
FIG. 4 is a flow chart illustrating a method according to an aspect of the present invention for defining the text lines array from an input image array.

FIG. 4 is a flow chart illustrating the method according to the present invention of generating text lines from an input image array according to an aspect of the present invention. Starting at step 401, the method begins having an input image array as input. The sufficient stability threshold is computed at step 402. At step 403, all white pixels for which the horizontal distance value is less than the sufficient stability threshold are turned to black. When step 403 is finished, the result is the raw text lines array.

The text lines are computed from the raw text lines by steps which improve the performance of the later methods that extracts the text regions array from the text lines array. At step 404, any top or bottom concavities are filled in the raw text lines by horizontal projection operations. Thus, a white pixel becomes black if its nearest neighboring black pixels to the left and right in the same pixel row belong to the same connected component. At step 405, any connected components having less than a minimum pixel area are deleted. In the preferred embodiment, the threshold is ten pixels. The method is done at step 406 resulting in the text lines array. FIG. 5 illustrates the text lines array resulting from the method illustrated in FIG. 4 applied to the input image array illustrated in FIG. 3.

The method 400 for generating a text lines array from an input image array according to the present invention is quite tolerant of skew. Skew is vertical drift in the text lines. Two adjacent characters can potentially be linked into the same text line as long as there is some vertical overlap between them. Once extracted, skewed lines may be de-skewed, so that the standard operations of the work surface may be applied to them. Also, the operations of the electronic work surface may be extended to apply directly to skewed lines.

According to another aspect of the present invention, a method extracts text regions from the text lines array. The text regions correspond roughly to paragraphs. Text regions are extracted by the following operation: a white pixel in the text line array is set to black in the result if its vertical distance value is no more than the maximum frequency-stability threshold computed from the vertical distance values at Voronoi tessellation points. The black connected components of the result from the application of this operation to all white pixels in the text lines array are termed text regions. The vertical distance at a white pixel is the distance to the nearest black pixel in the same image pixel column. A Voronoi tessellation point is a white pixel at which the distance to its Euclidean nearest black pixel is equal to some adjacent white pixel's distance to its Euclidean nearest black pixel, where the two Euclidean nearest black pixels are in distinct connected black components.

The maximum frequency stability threshold is defined in relation to the stability grouping approach of the '491 Patent. Given some collection C of values of some property P, we first compute the frequencies of P values in C. Therefore, this array of frequencies is the histogram of C. Then, treating these frequencies just as if they were distance values, a maximum stability threshold is computed on frequency value, by directly applying the algorithm of the '491 Patent to the array of frequencies. Finally, the P value p is computed whose frequency is the maximum stability threshold; p is the maximum frequency stability threshold on P.

Figure 6:
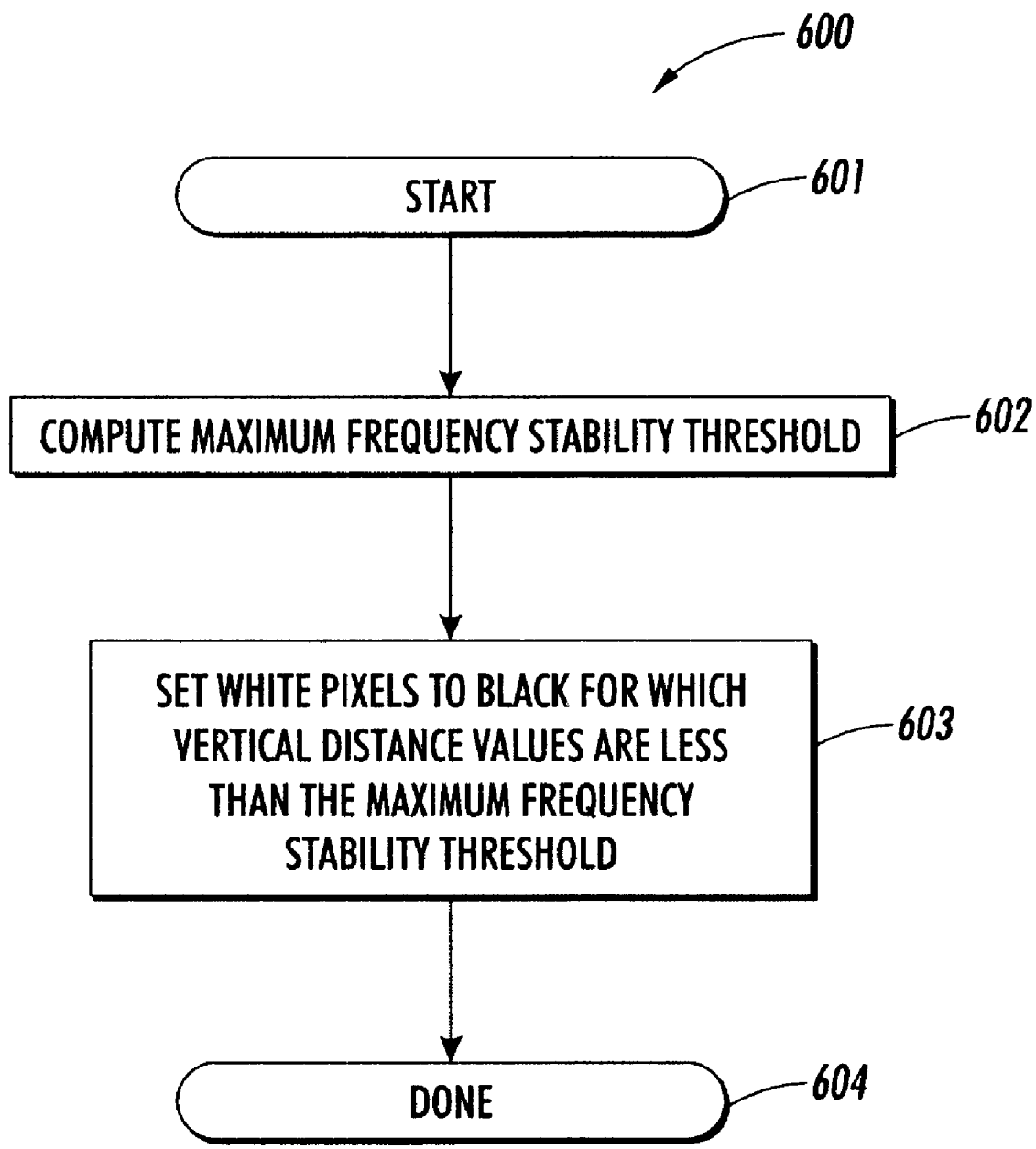
FIG. 6 is a flow chart illustrating a method according to another aspect of the present invention for creating a text regions array.
Figure 7:
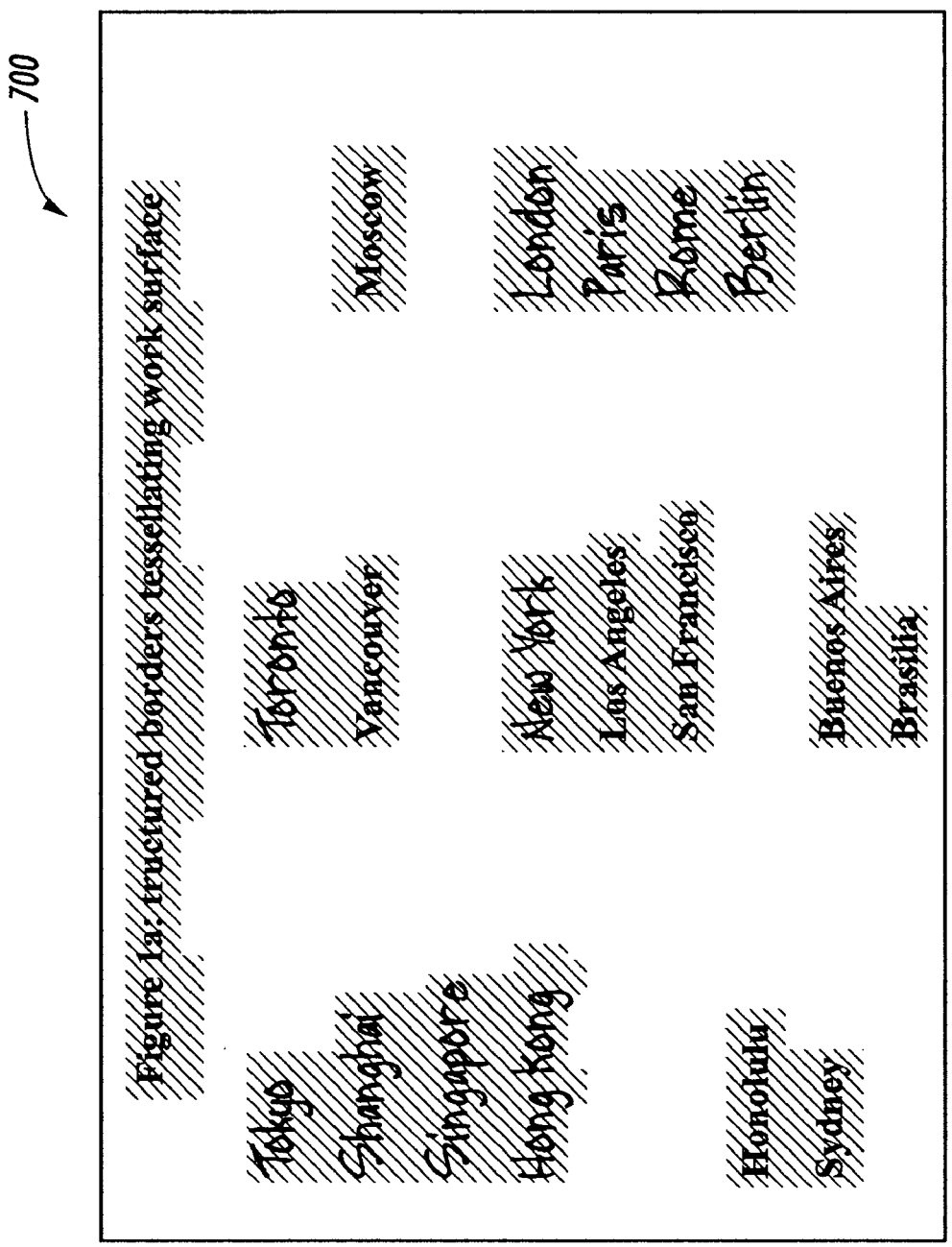
FIG. 7 is a visual representation of the text regions array generated by the method according to another aspect of the present invention illustrated in FIG. 6 from the text lines array illustrated in FIG. 5.

FIG. 6 illustrates this method according to another aspect of the present invention for generating a text regions array from the text lines array. The method starts at step 601. At step 602, the maximum frequency stability threshold described above is computed. At step 603, all white pixels for which the vertical distance values are less than the maximum frequency stability threshold are set to black in the text regions array. This another aspect of the present invention is complete at step 604 as the text regions array is complete. FIG. 7 illustrates a text regions array resulting from the application of the method 600 to the text lines array illustrated in FIG. 5.

According to yet another aspect of the present invention, enclosure blobs are extracted as follows. First, a white pixel in the text region array is set to black if the distance to its Euclidean nearest black pixel is less half the associated nearest neighbor distance. The black connected components of this result are termed enclosure blobs. The nearest neighbor distance associated with a white pixel is the minimum distance value at any Voronoi boundary pixel of the black connected component that contains the nearest black pixel. The Voronoi boundary pixels of a black connected component are the edge pixels of the Voronoi region of the black connected component. The Voronoi boundary pixels are the pixels in the Voronoi region of the black connected component that have a neighboring pixel that is not within the Voronoi region of the same black connected component. The Voronoi region of a black connected component is the set of pixels that are closer to a pixel in the black connected component than they are to pixels of any other black connected component.

Figure 8:
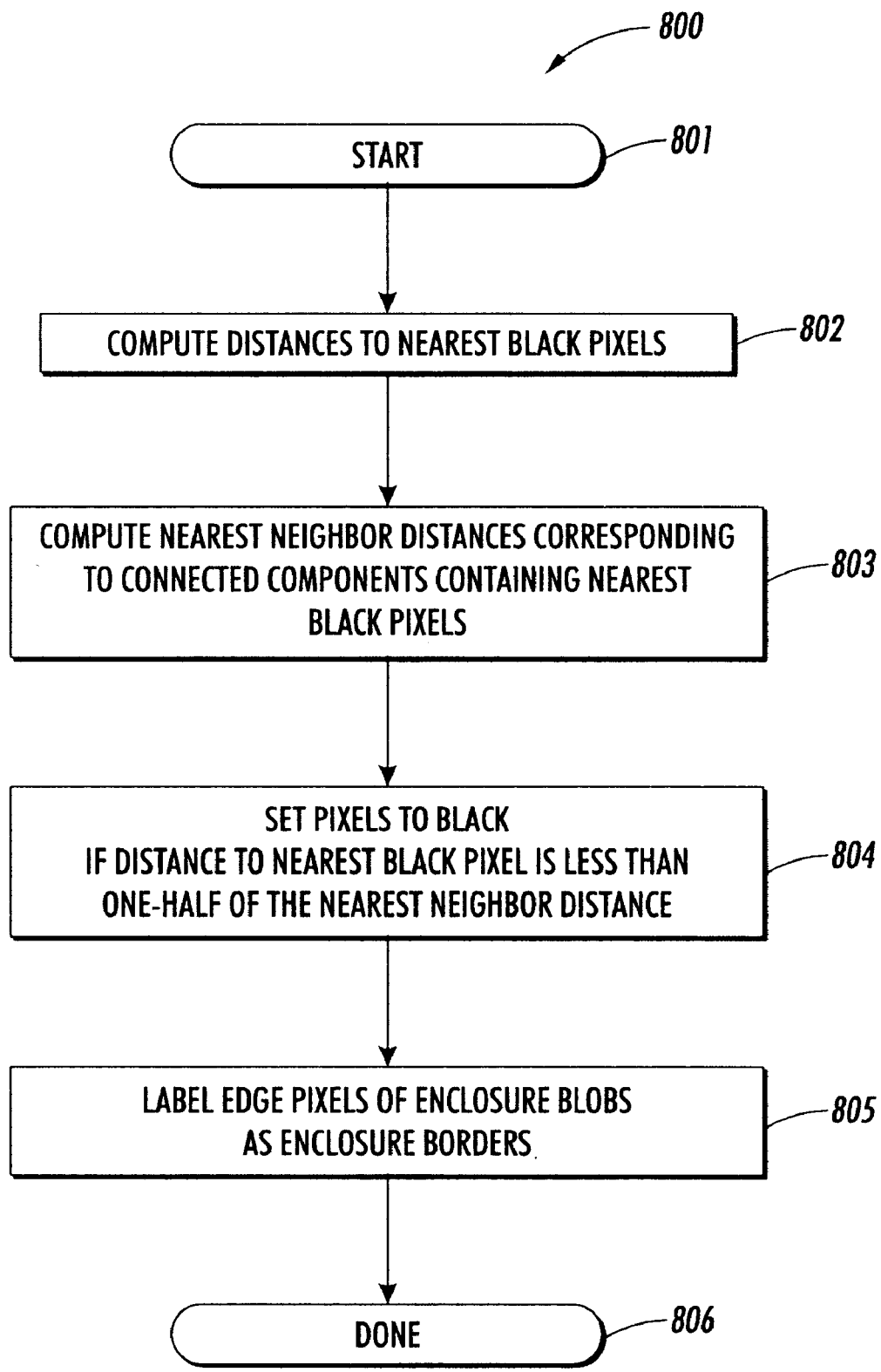
FIG. 8 is a flow chart illustrating a method according to yet another aspect of the present invention for extracting enclosure blobs and borders from the text regions array.

FIG. 8 illustrates the above-described method according to yet another aspect of the present invention. The method starts at step 801. The distances to the nearest black pixels are computed for each white pixel at step 802. At step 803, for each white pixel, the nearest neighbor distance corresponding to the connected component containing the nearest black pixel is computed. At step 804, white pixels are set to black if the distance to the nearest black pixel is less than some predetermined multiple of the nearest neighbor. In the preferred embodiment, the predetermined multiple is one-half, or alternatively is one. At step 805, the edge pixels of the enclosure blobs are labeled as enclosure borders. The method is complete at step 806 in which the enclosure blob array is has been written.

Figure 9:
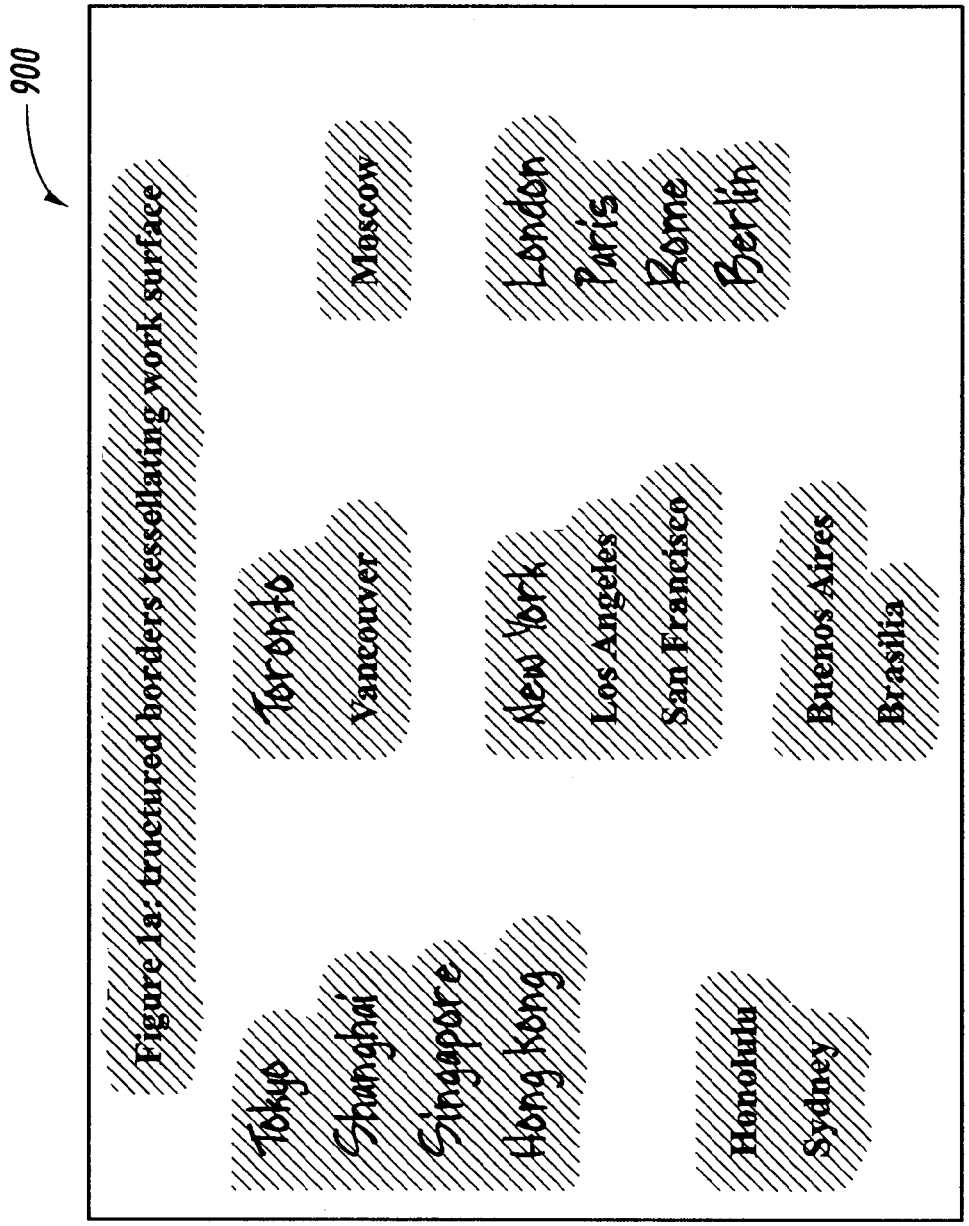
FIG. 9 is a visual representation of an enclosure blob array generated by the method according to yet another aspect of the present invention illustrated in FIG. 8 from the text regions array illustrated in FIG. 7 in which the predetermined multiple is ½.
Figure 10:
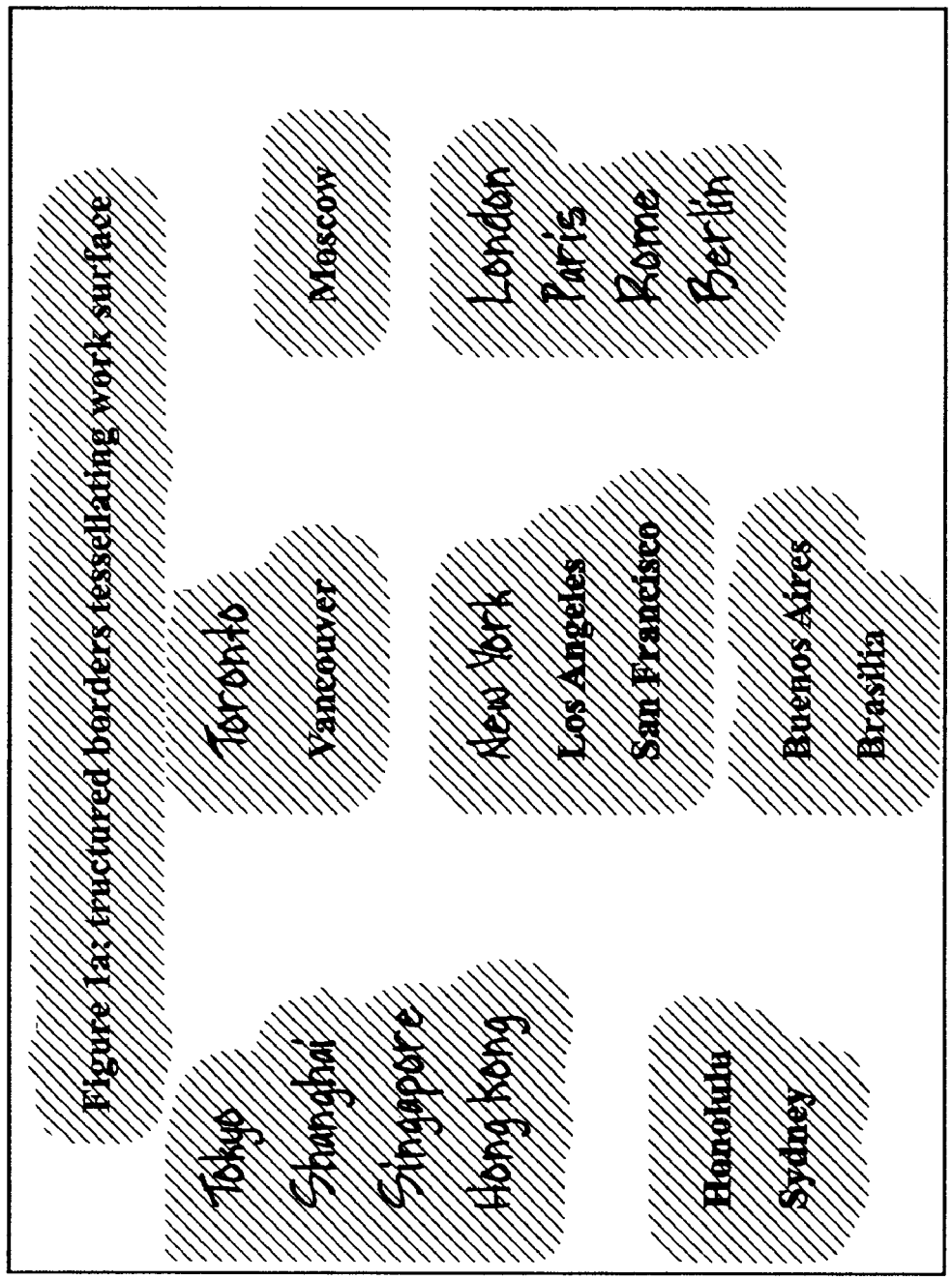
FIG. 10 is a visual representation of another enclosure blob array generated by the method according to yet another aspect of the present invention illustrated in FIG. 8 from the text regions array illustrated in FIG. 7 in which the predetermined multiple is one.
Figure 11:
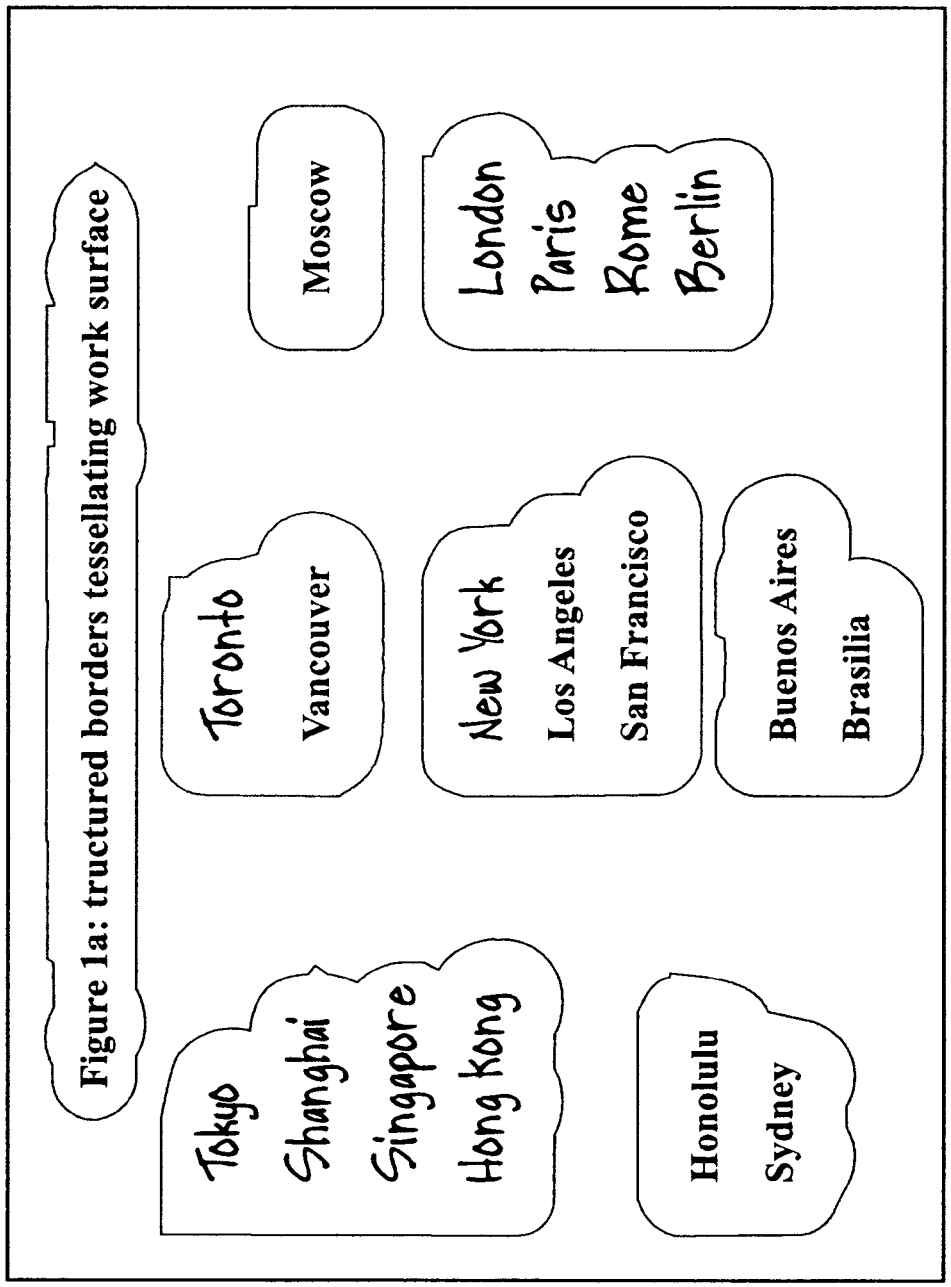
FIG. 11 is a visual representation of an enclosure border array generated by the method according to yet another aspect of the present invention illustrated in FIG. 8 from the text regions array illustrated in FIG. 7 in which the predetermined multiple is ½.

FIG. 9 illustrates an enclosure blob array in which the predetermined multiple is one-half resulting after step 804 of the method 800 applied to the enclosure regions array 700 illustrated in FIG. 7. FIG. 10 illustrates an enclosure blob array in which the predetermined multiple is one resulting after step 804 of the method 800 applied to the enclosure regions array 700 illustrated in FIG. 7. FIG. 11 illustrates the enclosure borders generated after step 805 of the method 800 in which the predetermined multiple is one-half, along with the input image shown in FIG. 3.

According to still another aspect of the present invention, a method extracts structured borders which tesselate the electronic work surface. The structured borders consist of straight vertical and horizontal lines which divide the electronic work surface into rectangular regions corresponding to each of the text regions. The method according to still another aspect of the present invention for extracting structured borders is illustrated in FIGS. 12, 13, and 14.

Figure 12:
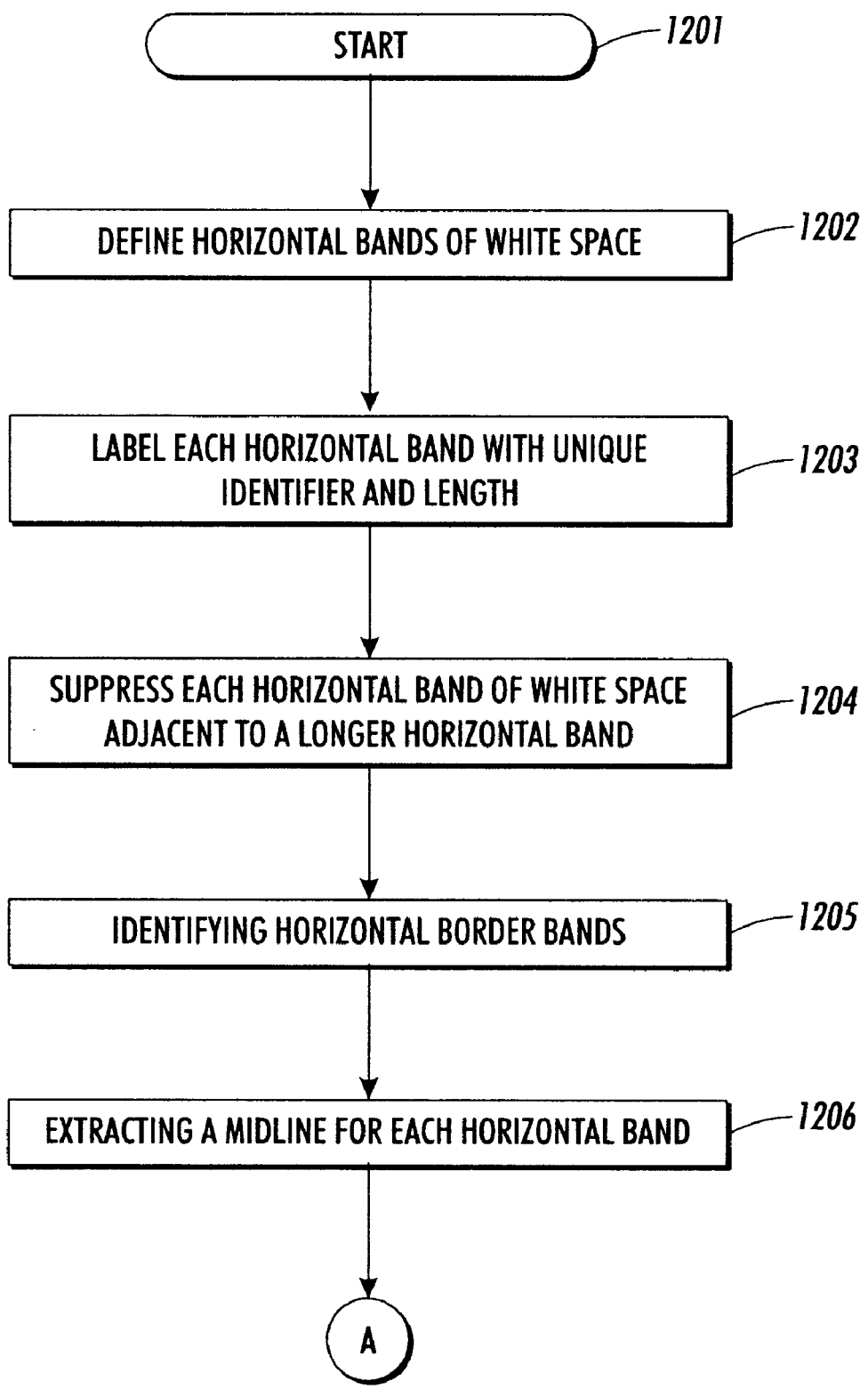
FIGS. 12, 13, and 14 are a flow chart illustrating a method according to still another aspect of the present invention for extracting structured borders.
Figure 15:
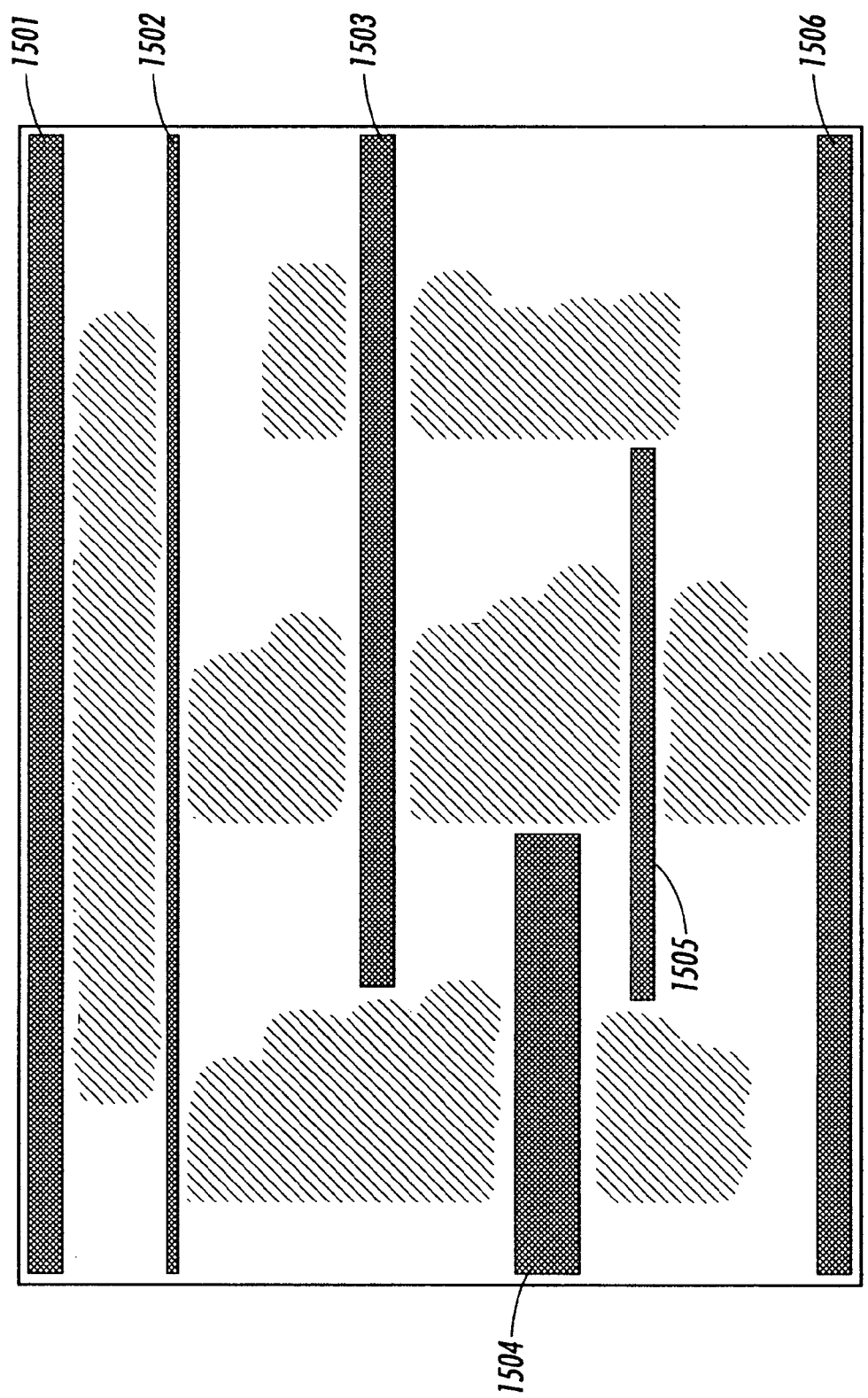
FIG. 15 illustrates the horizontal maximal bands generated by the method illustrated in FIG. 12 as applied to be enclosure blob array 900.

FIG. 12 illustrates the steps performed in extracting horizontal midlines. The method begins at step 1201. At step 1202, horizontal bands of white space are defined using two-dimensional projection operations. At step 1203, each horizontal band of white space is labeled with a unique identifier and with its length. For example, horizontal bands bounded on the top and bottom by distinct black connected components are defined as follows: a white pixel is labeled with the concatenation of the connected component identifiers of the nearest black pixels to the top and bottom in the same pixel column. Similar computations produce bands that are bounded by a black component on either the top or bottom and by an image border on the other of either the top or bottom, or by image borders on both the top and bottom. The length of a horizontal band is taken to be the mode of the horizontal run lengths in that band. At step 1204, any band adjacent to a longer band is suppressed. The remaining bands are called horizontal maximal bands. FIG. 15 illustrates the horizontal maximal bands 1501 through 1506 which result from the application of steps 1202 through 1204 to the enclosure blob array 900 illustrated in FIG. 9. In FIG. 15 the horizontal maximal bands 1501 through 1506 are shown in black.

Figure 16:
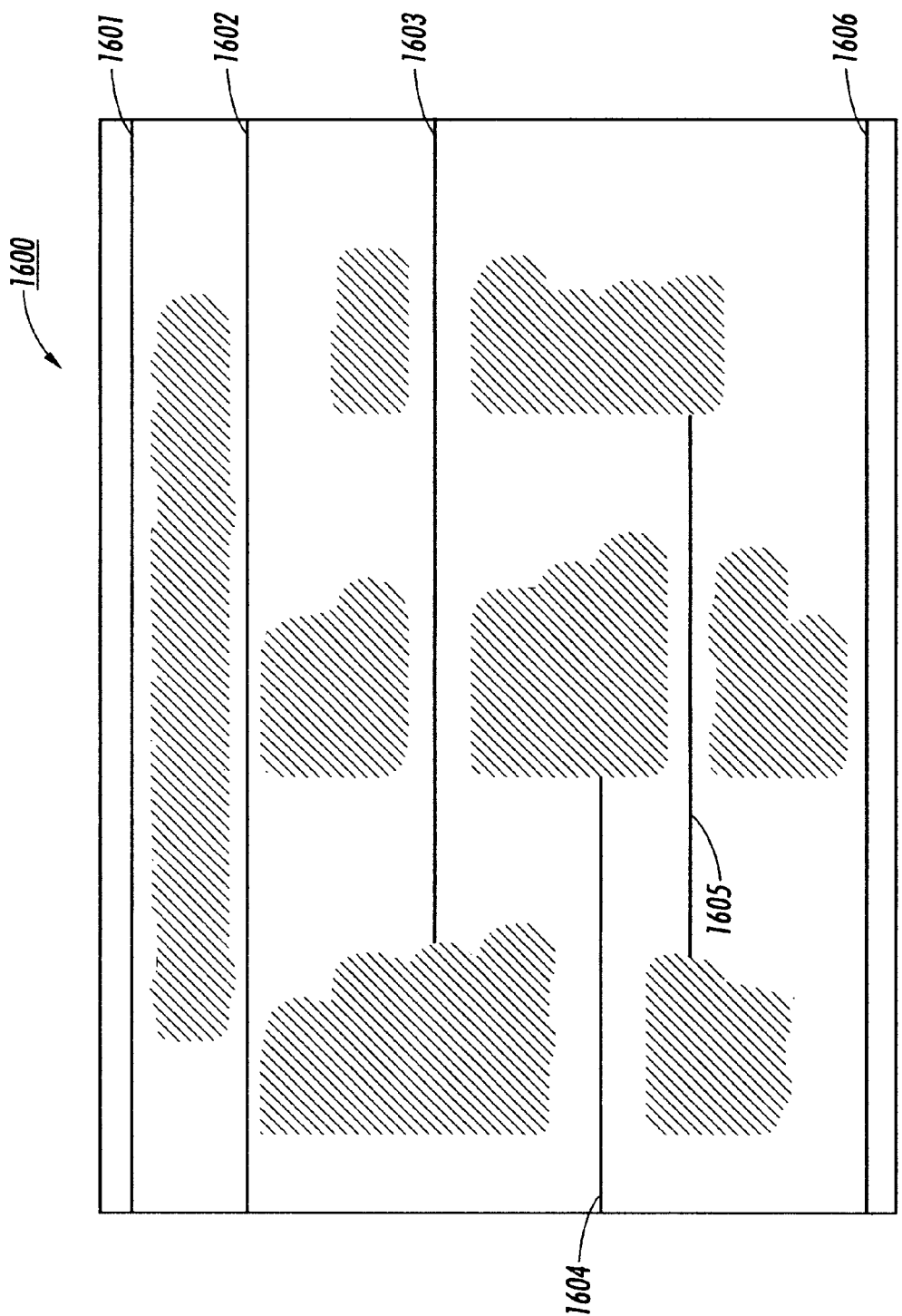
FIG. 16 illustrates the horizontal midlines extracted from the horizontal maximal bands illustrated in FIG. 15.

At step 1205, the horizontal border bands are identified. Border bands are those bands which run along a border of an image, such as bands 1501 and 1506 in FIG. 15. At step 1206, a midline for each horizontal band is extracted. The midline of a horizontal band is taken to be the horizontal midline of its bounding rectangle. FIG. 16 illustrates the horizontal midlines 1601 through 1606 which corresponded to horizontal bands 1501 through 1506 in FIG. 15.

Figure 13:
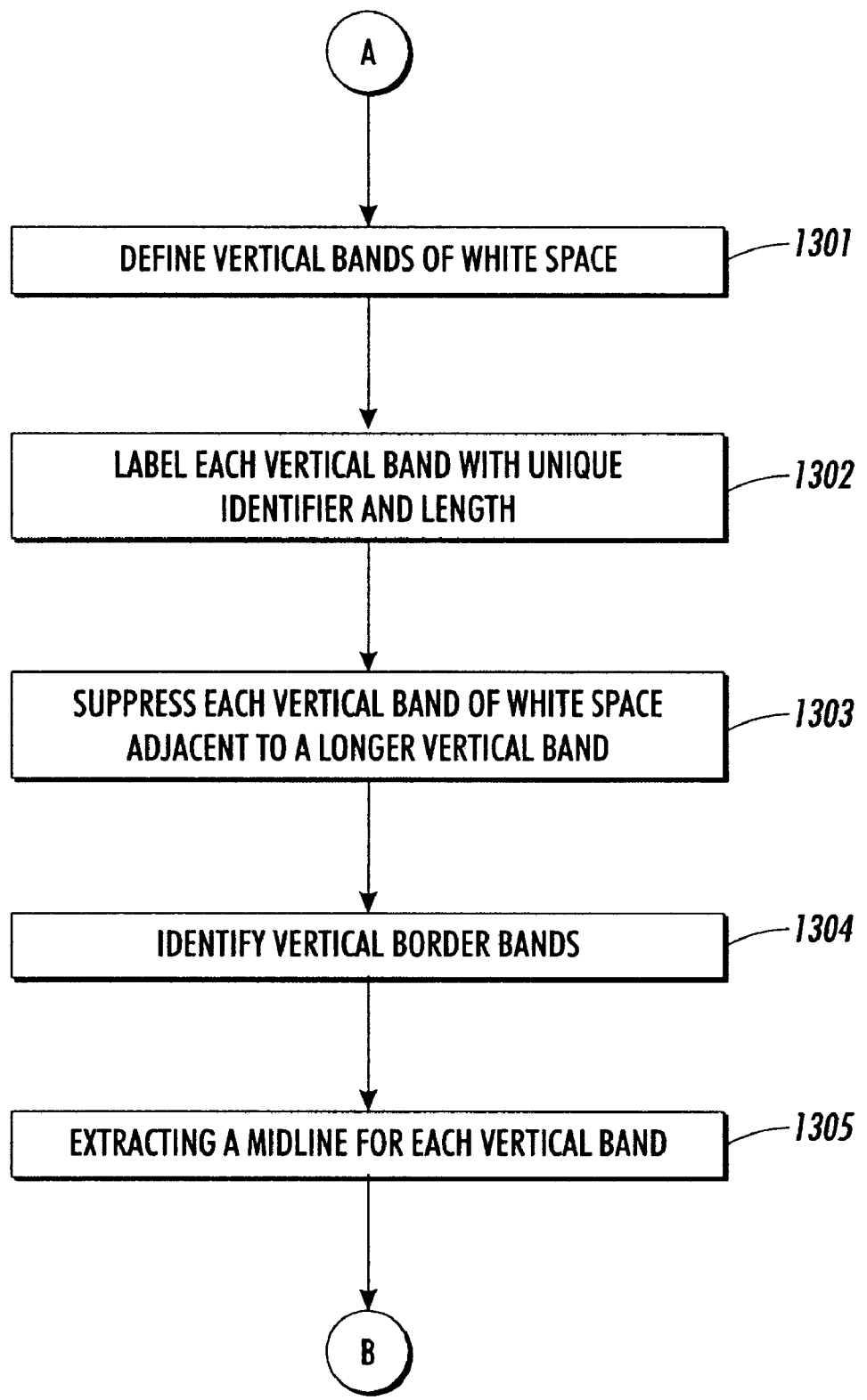
Figure 14:
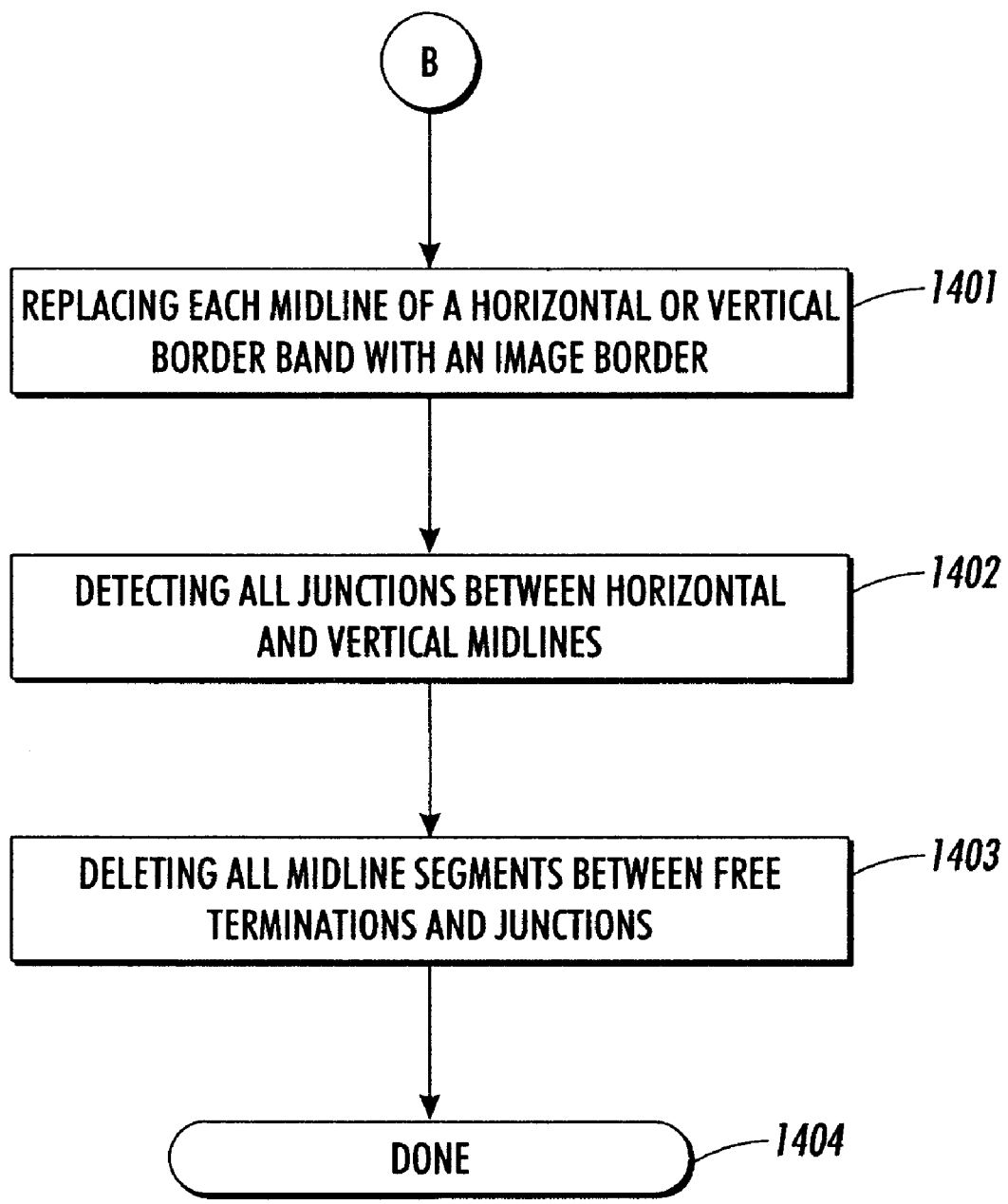
Figure 17:
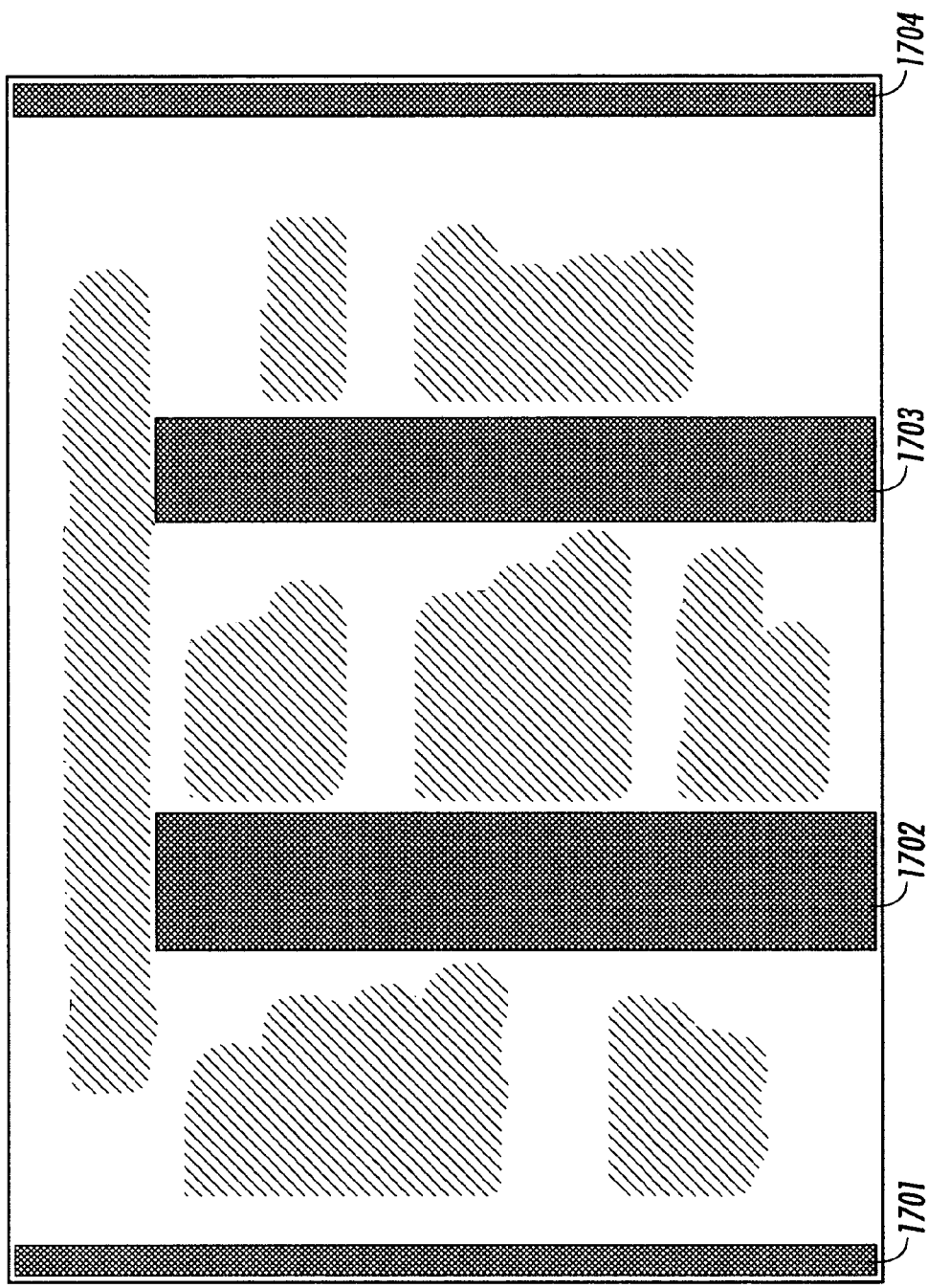
FIG. 17 illustrates the vertical maximal bands generated by the method illustrated in FIG. 13 has applied to the enclosure blob array 900.

FIG. 13 illustrates the steps performed in extracting vertical midlines. At step 1301, vertical bands of white space are defined using two-dimensional projection operations. At step 1302, each vertical band of white space is labeled with a unique identifier and with its length. For example, vertical bands bounded to the left and right by distinct black connected components are defined as follows: a white pixel is labeled with the concatenation of the connected component identifiers of the nearest black pixels to the right and left in the same pixel row. Similar computations produce bands that are bounded by a black component on one side and by an image border on the other, or by image borders on both sides. The length of a vertical band is taken to be the mode of the vertical run lengths in that band. At step 1303, any band adjacent to a longer band is suppressed. The remaining bands are called vertical maximal bands. FIG. 17 illustrates the vertical maximal bands 1701 through 1706 which result from the application of steps 1301 through 1303 to the enclosure blob array 900 illustrated in FIG. 9. In FIG. 17 the vertical maximal bands 1701 through 1704 are shown in black.

Figure 18:
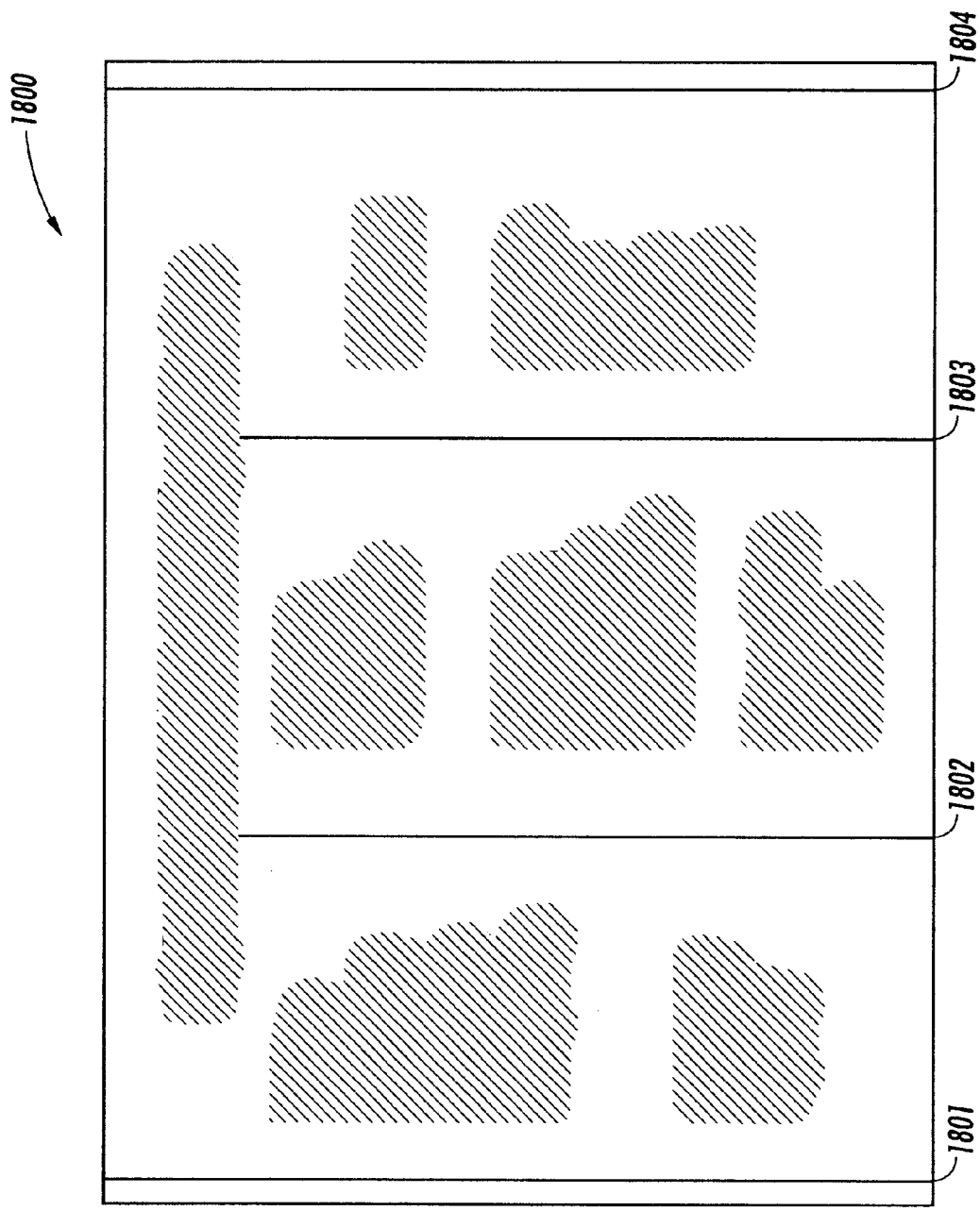
FIG. 18 illustrates the vertical midlines extracted from the vertical maximal bands illustrated in FIG. 17.

At step 1304, the vertical border bands are identified. Border bands are those bands which run along a border of an image, such as bands 1701 and 1704 in FIG. 17. At step 1305, a midline for each vertical band is extracted. The midline of a vertical band is taken to be the vertical midline of its bounding rectangle. FIG. 18 illustrates the vertical midlines 1801 through 1804 which corresponded to vertical bands 1701 through 1704 in FIG. 17.

Figure 19:
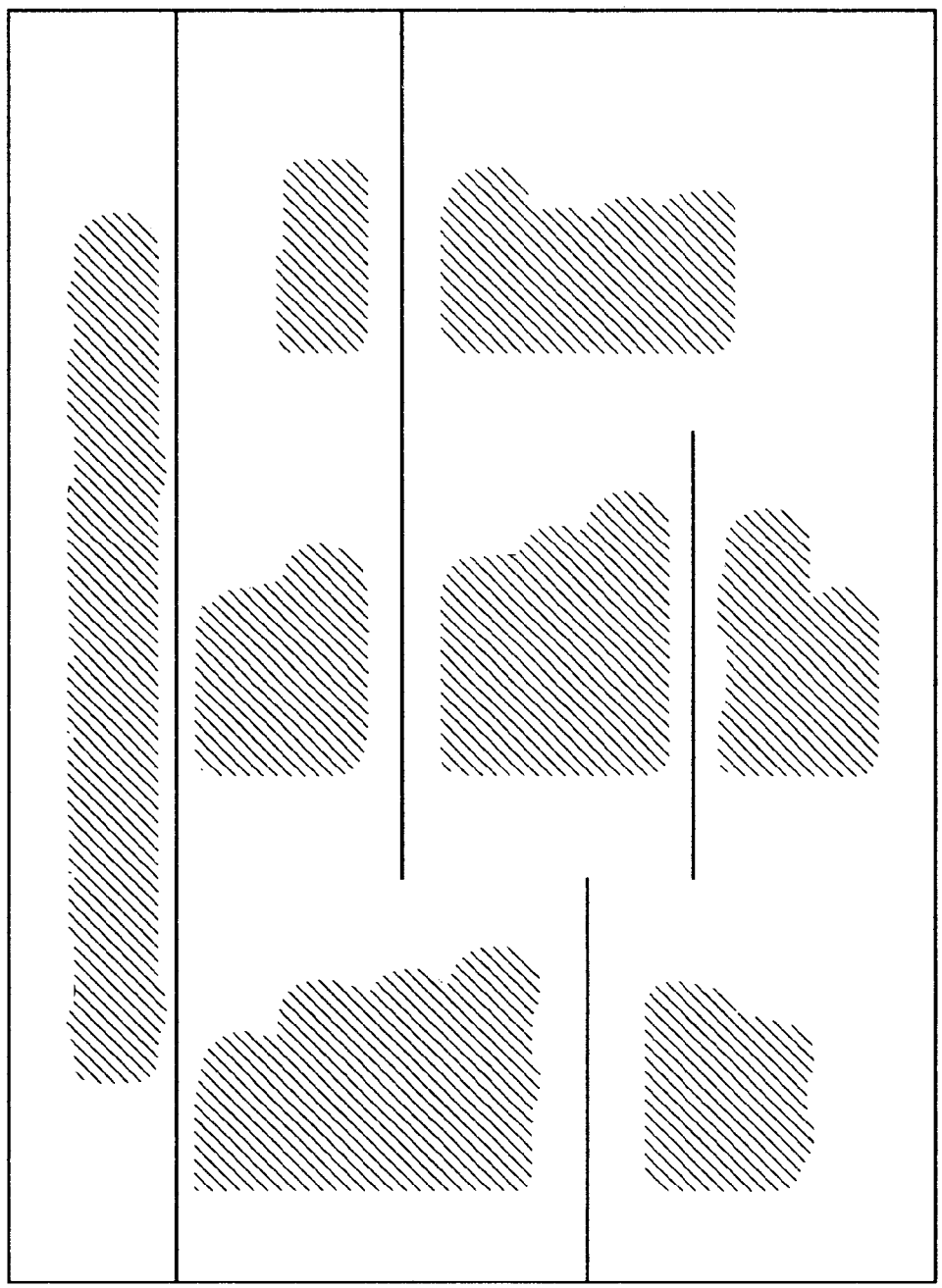
FIG. 19 illustrates the horizontal midline segments extracted from the horizontal midlines by the method illustrated in FIG. 14.
Figure 20:
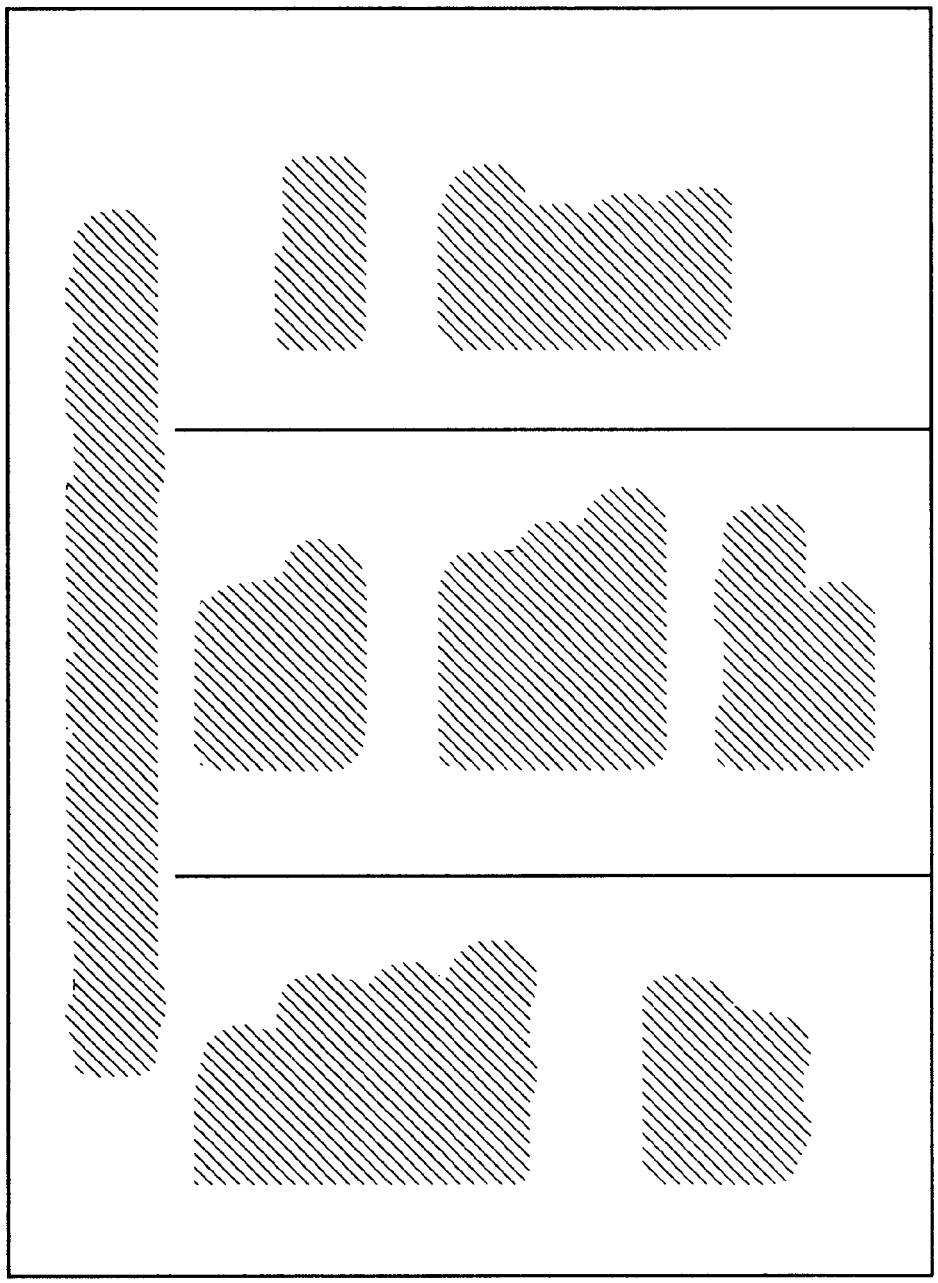
FIG. 20 illustrates the vertical midline segments extracted from the vertical midlines by the method illustrated in FIG. 14.

FIG. 14 illustrates the steps for creating the structured borders from the horizontal and vertical midlines. At step 1401, each midline of a horizontal or vertical border band is replaced with an image border. At step 1402, the junctions between horizontal and vertical midlines are detected. Given a horizontal and a vertical midline, the two midlines are intersected (therefore logically ANDed) to give the junction. At step 1403, all midline segments between a junction and a free termination are deleted. A free termination is a midline segment end which is not coincident with an image border. FIG. 19 illustrates the horizontal midline segments from the midline array 1600 shown in FIG. 16 in which all midline segments between junctions of the horizontal midlines 1600 and vertical midlines 1800 shown in FIG. 18 and free terminations have been deleted. Similarly, FIG. 20 illustrates the vertical midline segments from the midline array 1800 shown in FIG. 18 in which all midline segments between junctions of the horizontal midlines 1600 and vertical midlines 1800 and free terminations have been deleted. FIG. 21 illustrates the structured borders superimposed upon the input image array 300 resulting from the application of the method shown in FIGS. 12–14 for extracting structured borders to the enclosure blob array 900 shown in FIG. 9.

According to yet still another aspect of the present invention, a method for extracting freeform linear borders tesselates the electronic workspace involves computing a Voronoi tesselation of the text regions or enclosure blobs 900. The Voronoi boundaries of the text regions or enclosure blobs are topologically closely related to the structured borders computed the method in the preceding subsection.

Figure 22:
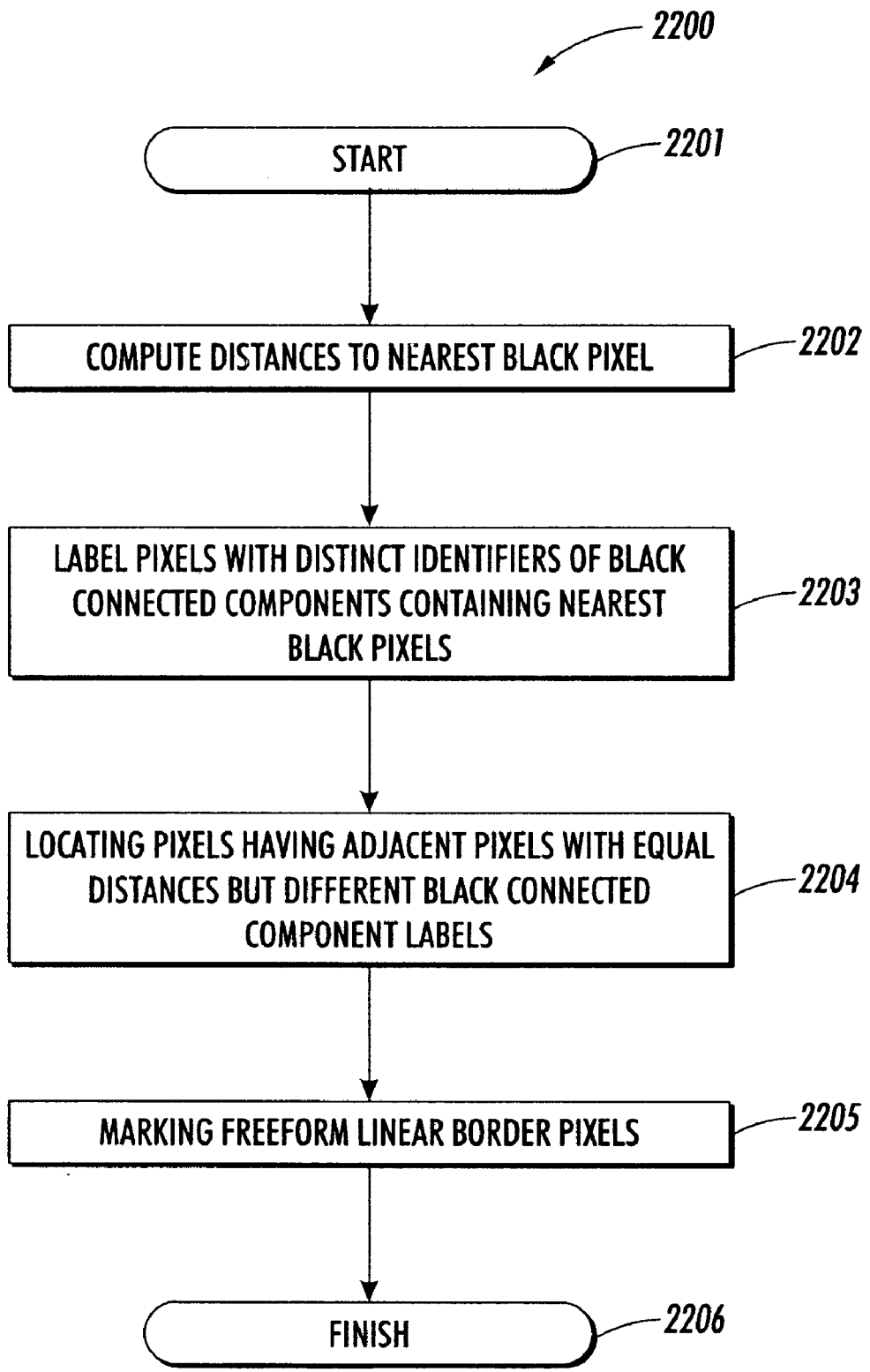
FIG. 22 is a flow chart illustrating a method according yet still another aspect of the present invention for generating a freeform linear border array.
Figure 23:
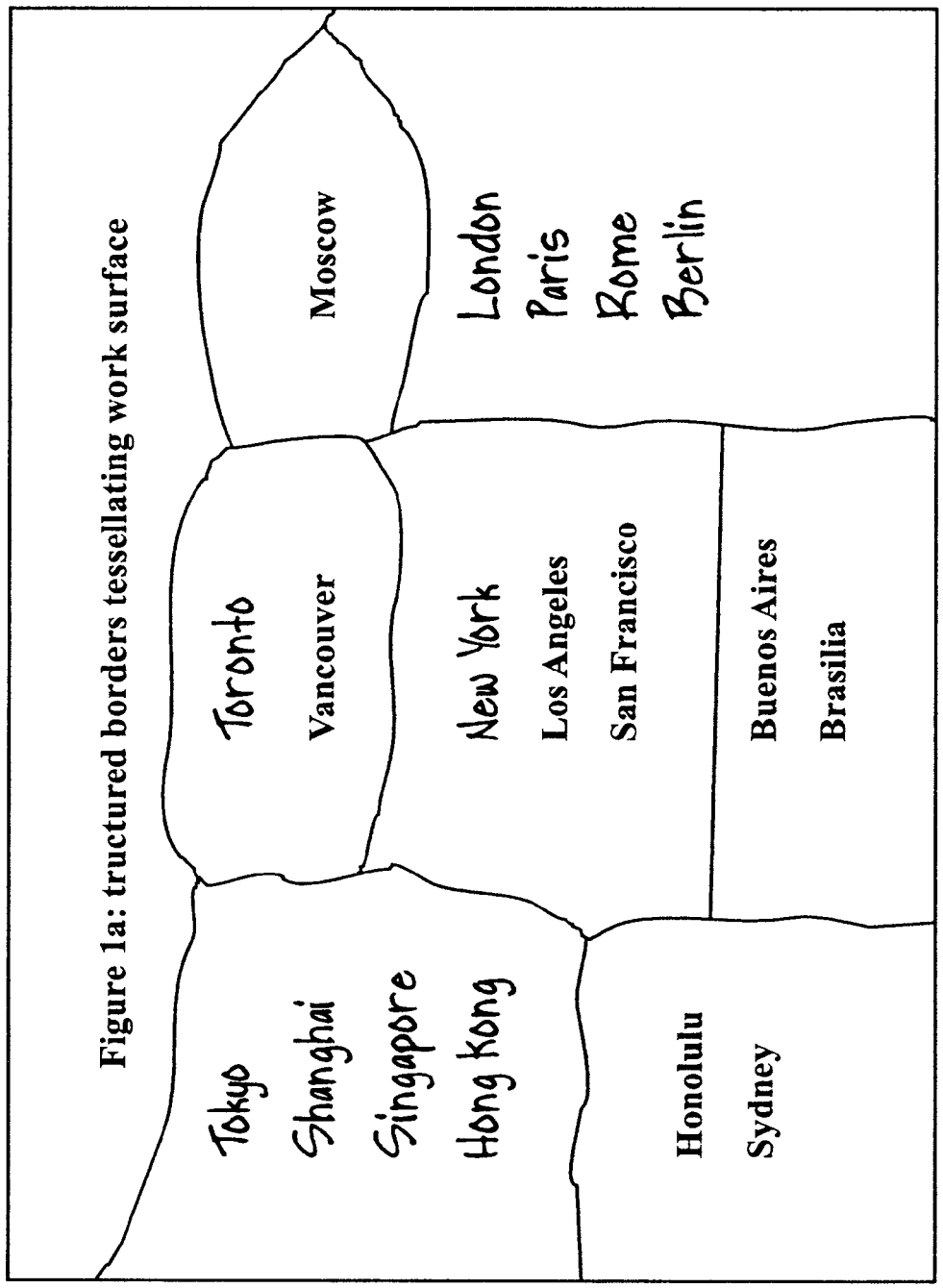
FIG. 23 is a visual representation of the freeform linear borders array generated according to yet still another aspect of the present invention illustrated in FIG. 14 from the text regions array illustrated in FIG. 7.

FIG. 22 illustrates the method according to yet still another aspect of the present invention for extracting freeform linear borders. The method starts at step 2201 with an enclosure blob array such as 900 illustrated and FIG. 9. At step 2202, for each white pixel, the distance to the nearest black pixel is computed. At step 2203, a 40 each white pixel, the white pixel it is labeled with a distinct identifier of the black connected component containing nearest black pixel. At step 2204, the method locates all white pixels having adjacent white pixels with equal distances but different black connected component labels. At step 2205, all such white pixels located in step 2204 are marked as free-form linear border pixels. The method is finished at step 2206. FIG. 23 illustrates the free-form linear borders superimposed upon the input image array 300 resulting from the execution of the method 2200 using the enclosure blob array 900 as input.

The preferred embodiment is primarily pixel-based. The primitive operations it employs, such as distance transforms and Voronoi tessellation, connected component labeling, to dimensional projections, apply to two dimensional pixel arrays. An alternative embodiment includes a stroke based representation of the work surface. For instance, all input strokes are preprocessed by subdivision into substrokes of a certain small fixed length, and typed characters and other objects are represented by their bounding box curve. Specialized distance transformation and Voronoi tesselation operations are defined for this representation. Care must be taken in such an embodiment not to lose the statistical information about intercharacter and interline spacings that is available in the pointwise representations.

Because the user can easily edit the borders created by the methods of the present invention, having the automatic techniques incorporated into an interactive system means that the automatic techniques do not have to perfectly match the user's intentions; they only need to approximate the user's perception. For example, a vertical border running through a title area is undesirable and may be deleted by the user.

Different choices of border configurations corresponding to the various border types can be generated, in addition to a view without borders. The views may also be switched by the user, for example, via a menu command.

In the case of freeform linear borders deduced from Voronoi boundaries, the user may straighten these out, and if required, the objects on the screen will be automatically adjusted to maintain region membership. One way for the user to perform this border straightening is to gesture along a portion of the desired border.

Implicit borders based on spatial separation can be used in an ephemeral way that does not add new objects to the work surface. If the user wants to perform structured list operations on one cluster of material, he should not have to take the trouble to explicitly create borders to delimit the structure that is perceptually obvious from the spatial separations. Moreover, the user may like the way the material looks without the clutter and distraction of borders. Implicit ephemeral borders are generated on the fly when the user initiates a structured operation, for example, making a structured selection via a bracket gesture. These ephemeral borders are highlighted and visually distinguished from the editable borders. Ephemeral borders provide feedback on how the system is interpreting the grouping of objects on the work surface during the structured operation, from which the user can see precisely which cluster of objects will be affected by the operation. After an operation has been completed and the selection dismissed, the ephemeral borders go away.

For example, given the initial configuration without borders, after the user selects a list item, say "Paris," ephemeral borders appear, along with a selection box around the word "Paris". After a command, such as moving "Paris" under "Shanghai," the ephemeral borders are regenerated to account for changes to the affected object clusters. Finally, when the user dismisses the selection, the ephemeral borders would vanish.

Although the present invention has been described in its presently preferred embodiment, that embodiment is offered by way of example, not by way of limitation. It is to be understood that various additions and modifications can be made without departed from the spirit and scope of the present invention. Accordingly, all such additions and modifications are deemed to lie with the spirit and scope of the present invention as set out in the appended claims.

What is claimed is:

1. A method for generating a text lines array from an input image array, the method comprising the steps of:
   computing a sufficient stability threshold; and
   for each white pixel in the input image array, setting a corresponding pixel in the text lines array to black if a horizontal distance value from the white pixel to a nearest black pixel in a same image pixel row is less than the sufficient stability threshold.

2. A method as in claim 1, further comprising the steps of:
   filling in top and bottom concavities in the text lines array by horizontal projection operations.

3. A method as in claim 2, wherein the filling step includes the steps of
   setting every white pixel in the text lines array for which its nearest neighboring black pixels to the left and right in a same text lines array pixel row belong to a same connected component.

4. A method as in claim 3, further comprising the steps of:
   eliminating all connected components in the text lines array having an area less than a minimum area threshold.

5. A method as in claim 4, wherein the minimum area threshold is ten pixels.

6. A method for generating a text regions array from a text lines array, the method comprising the steps of:
   computing a maximum frequency stability threshold from a Voronoi tessellation point; and
   for each white pixel in the text lines array, setting a corresponding pixel in the text regions array to black if a vertical distance value is not greater than the maximum frequency stability threshold.

7. A computer readable storage medium comprising:
   computer readable program code embodied on said computer readable storage medium, said computer readable program code for programming a computer to perform a method for generating a text lines array from an input image array, the method comprising the steps of
   computing a sufficient stability threshold; and
   for each white pixel in the input image array, setting a corresponding pixel in the text lines array to black if a horizontal distance value from the white pixel to a nearest black pixel in a same image pixel row is less than the sufficient stability threshold.

8. A computer readable storage medium as in claim 7, the method further comprising the steps of:
   filling in top and bottom concavities in the text lines array by horizontal projection operations.

9. A computer readable storage medium as in claim 8, wherein the filling step includes the steps of:
   setting every white pixel in the text lines array for which its nearest neighboring black pixels to the left and right in a same text lines array pixel row belong to a same connected component.

10. A computer readable storage medium as in claim 9, the method further comprising the steps of:
    eliminating all connected components in the text lines array having an area less than a minimum area threshold.

11. A computer readable storage medium as in claim 10, wherein the minimum area threshold is ten pixels.

12. A computer readable storage medium comprising:
    computer readable program code embodied on said computer readable storage medium, said computer readable program code for programming a computer to perform a method for generating a text regions array from a text lines array, the method comprising the steps of:
    computing a maximum frequency stability threshold from a Voronoi tessellation point; and
    for each white pixel in the text lines array, setting a corresponding pixel in the text regions array to black if a vertical distance value is not greater than the maximum frequency stability threshold.

13. The method of claim 1, wherein the step of computing a sufficient stability threshold includes the steps of:
    determining a distance value from a fist pixel included in said input array to a second pixel in said input image array.

14. The method of claim 13, wherein the first pixel at which a distance to a nearest black pixel to the left of the first pixel is equal to a distance to a nearest black pixel to the right of the first pixel.

15. A method for generating an image border from an input image array having a plurality of pixels comprising the steps of:
    generating a text lines array having a plurality of pixels from the input image array, wherein the step of generating a text lines array includes the steps of:
    computing a sufficient stability threshold; and,
    setting, for each pixel in the input image array, a respective pixel in the text lines array to a first value, if a distance from a first pixel in the input image array to a second pixel in the input image array is less than the sufficient stability threshold;
    generating a text regions array from the text lines array; and,
    generating said image border from said text regions array.

16. A method for generating an image border from an input image array having a plurality of pixels comprising the steps of:
    generating a text lines array having a plurality of pixels from the input image array;
    generating a text regions array from the text lines array, wherein the step of generating a text regions array includes the steps of:
    computing a maximum frequency stability threshold; and,
    setting, for each pixel in the text lines array, a respective pixel in the text regions array to a first value, if a distance from a first pixel in the text lines array to a second pixel in the text lines array is less that the maximum frequency stability threshold;
    generating said image border from said text regions array.

* * * * *